(12) United States Patent
Uemura et al.

(10) Patent No.: US 7,321,726 B2
(45) Date of Patent: Jan. 22, 2008

(54) CAMERA MODULE AND PORTABLE TERMINAL EQUIPPED WITH THE CAMERA MODULE

(75) Inventors: Kouhei Uemura, Tokyo (JP); Katsumi Tsuji, Tokyo (JP)

(73) Assignee: Kyocera Corporation, Kyoto (JP)

( * ) Notice: Subject to any disclaimer, the term of this patent is extended or adjusted under 35 U.S.C. 154(b) by 317 days.

(21) Appl. No.: 11/021,488

(22) Filed: Dec. 23, 2004

(65) Prior Publication Data

US 2006/0013577 A1 Jan. 19, 2006

(30) Foreign Application Priority Data

| Dec. 26, 2003 | (JP) | ............................. 2003-435743 |
| Dec. 26, 2003 | (JP) | ............................. 2003-435745 |
| Jan. 30, 2004 | (JP) | ............................. 2004-024568 |
| Jan. 30, 2004 | (JP) | ............................. 2004-024632 |

(51) Int. Cl.
*G03B 17/12* (2006.01)
*H04N 5/225* (2006.01)

(52) U.S. Cl. ..................... 396/72; 396/535; 348/335; 348/374

(58) Field of Classification Search ............... 396/72, 396/79, 83, 85; 359/676, 694, 696, 699; 348/240.3, 335, 340, 345, 357, 373–375
See application file for complete search history.

(56) References Cited

U.S. PATENT DOCUMENTS 5,337,109 A * 8/1994 Ogawa ..................... 396/379

5,937,215 A * 8/1999 Mogamiya ..................... 396/85

FOREIGN PATENT DOCUMENTS

| JP | 04-065305 | 3/1992 |
| JP | 4-65305 | 6/1992 |
| JP | 05-188254 | 7/1993 |
| JP | 05-257050 | 10/1993 |
| JP | 06-214194 | 8/1994 |
| JP | 07-001438 | 1/1995 |
| JP | 07-063970 | 3/1995 |
| JP | 10/039401 | 2/1998 |
| JP | 10-062852 | 3/1998 |
| JP | 10-75545 | 3/1998 |
| JP | 11-305104 | 11/1999 |
| JP | 2003-258971 | 9/2000 |

(Continued)

*Primary Examiner*—W. B. Perkey
*Assistant Examiner*—Rishi S. Suthar
(74) *Attorney, Agent, or Firm*—Hogan & Hartson LLP

(57) ABSTRACT

The casing of the camera module is composed of two housings. The first housing has a base part provided with an opening for attaching a object side fixed lens and a first and second side walls extending from the base part, large cutout openings being formed between the side walls. Moving lens holders are inserted from the open side facing the base part of the first housing to be assembled to the first housing. A driving motor is bonded to a side wall of the second housing. After the first housing to which the lens moving mechanism, etc. are assembled and the second housing to which the driving motor is fixed, adjustment the lens moving mechanism, etc. can be done easily. The first and second housing are joined together with a single bolt and a single joining part joining by means of an adhesive agent.

14 Claims, 15 Drawing Sheets

FOREIGN PATENT DOCUMENTS

| | | |
|---|---|---|
| JP | 2002-169074 | 6/2002 |
| JP | 2002-182273 | 6/2002 |
| JP | 2002-214501 | 7/2002 |
| JP | 2002-258139 | 9/2002 |
| JP | 2003-84184 | 3/2003 |
| JP | 2003-131111 | 5/2003 |
| JP | 2003-262776 | 9/2003 |

* cited by examiner

CAMERA MODULE AND PORTABLE TERMINAL EQUIPPED WITH THE CAMERA MODULE

BACKGROUND OF THE INVENTION

1. Field of the Invention

The present invention relates to a camera module and a portable terminal provided with the camera module.

2. Description of the Related Art

A camera module having the function of autofocusing (AF) and/or zooming used for a portable terminal such as a mobile telephone is required to be constructed small in size.

When a camera module having an autofocusing (AF) function and/or zooming function is reduced in size, it is required to reduce the size of zoom lenses and the number of constituent parts. However, the zoom lenses must be moved in the direction of the optical axis of the lenses in order to change the focal distance thereof. Therefore, it is necessary to secure as long traveling distance of lenses as possible in a small space, and to downsize lens holders for retaining lenses and the moving mechanism or driving mechanism thereof. A variety of devisal are required to downsize the camera module while keeping easiness of assembling and adjusting.

As a camera module like this, there is disclosed a camera for example in Japanese Laid-Open Patent Application No. 7-63970 (hereafter referred to as patent literature 1), in which a cylindrical cam located at the side of the optical system of the camera is driven by a motor to move a lens holder for zooming and a lens holder for focusing. In Japanese Laid-Open Patent Application No. 2003-258971 (hereafter referred to as patent literature 2) is disclosed a camera module with zooming function for integrated into a mobile telephone, which is composed such that a lens holder for zooming and a lens holder for focusing are driven by rotating by hand a cylindrical cam partially exposing outside of the mobile telephone at the side face of the portion where optical system is accommodated.

Further, in Japanese Laid-Open Patent Application No. 6-214194 (hereafter referred to as patent literature 3) is disclosed a lens barrel on the inside surface of which is located a light shielding plate in a state deformed elastically. In Japanese Laid-Open Utility Model Application 4-65305 (hereafter referred to as patent literature 4) is disclosed a lens barrel on the inside surface of which is located a light shielding plate.

In Japanese Laid-Open Patent Application No. 10-62852 (hereafter referred to as patent literature 5) is disclosed a driving mechanism of camera which is provided with a motor which serves both for film feeding and autofocusing and a motor for zooming in order to perform the driving for autfocusing and the driving for feeding film in the opposite direction by a single driving motor with a simple construction constructed at a low cost, in which the transmission of the driving force of the motor serving both for film feeding and autofocusing is switched by means of planetary gear type clutches in the state of film winding and film feeding and in the state of film rewinding, and in which a gear for autofocus-driving is located where it can mesh with one or other of the planetary gear drives of the planetary gear type clutches, the position of one of the planetary gear is retained in the state it meshes with the gear for autofocus-driving with the limiting member and the limiting member being driven by the projecting and subtracting action of the zooming system in order to allow the limiting member to retain the driving system in the state that autofocus-driving is possible.

Further, in Japanese Laid-Open Patent Application No. 10-39401 (hereafter referred to as patent literature 6) and in Japanese Laid-Open Utility Model Application Publication No. 7-1438 (hereafter referred to as patent literature 7) is disclosed to aim to reduce noise and vibration a motor mounting structure in which the motor is sandwiched and fixed with a pair of ribs and vibration is absorbed by providing an elastic member on the periphery of the motor, and a structure in which the motor is fixed with screws by way of vibration absorbing members.

There are also known a motor mounting structure in which the periphery of the motor is bonded by means of a double-stick tape to the inside face of a motor holder which is formed by combining a base part and motor attaching wall in a general shape of letter "L" and the base part of the motor holder is fixed to the camera body by means of screws.

As a camera module, there are known one which is downsized by locating a lead screw for autofocusing and a lead screw for zooming on one side of the case and making it possible to assemble lenses from one side of the lens barrel of the camera module (hereafter referred to prior art 1), and one in which switching between telephotographing and macro-photographing in pan-focus lenses is done by means of a cylindrical cam located adjacent to lens frames (hereafter referred to prior art 2).

Further, there are known a lens moving mechanism for utilizing the space of lens barrel efficiently, in which a supporting part of the guide of lens frames is provided in a housing retaining a subject side lens and lens frames for zooming and focusing are driven by means of two lead screws (hereafter referred to prior art 3); a lens moving mechanism for configuring the lens barrel in small size, in which are provided a lead screw for zooming in the first quadrant around the optical axis, a lead screw for focusing in the second quadrant, and a guide shaft for guiding lens frames in the third quadrant (hereafter referred to prior art 4); a lens moving mechanism in which a subject side lens is retained in a upper housing, lens frames for zooming and focusing are driven by two lead screws respectively, bearings for the two lead screws and two guide shafts of the lens frames are provided in the upper housing, and CCD is attached to a lower housing (hereafter referred to prior art 5), and a camera module in which a light shielding cover is provided to cover the part where the lead screw mechanism for moving lenses is mounted (hereafter referred to prior art 6).

Further, as the downsizing of camera module for a portable terminal advances, the driving motor becomes small and the attaching of the motor becomes difficult as mentioned before. To resolve the problem, a composition is known in which a cylindrical step motor is located effectively in an lens-barrel to reduce the thickness of the lens-barrel and the lenses can be driven accurately and at high speed (hereafter referred to prior art 7). According to this prior art, the front lens group is located fixedly in the front side of the aperture position in the lens-barrel, the rear lens group is formed to have its lower part removed, a shutter consisting of two blades which are driven to open and shut in a range not interfere with the removed portion, the shutter serving both as the aperture, and the cylindrical step motor is located astride of the aperture position in the space below the rear lens group and front lens group.

Further, a composition is known in which, in order to construct a camera module to be thin and furthermore to realize accurate focusing and image zooming by moving lens position, lenses are fixed to the first and second barrel so that the lenses for focusing an image to an image pickup device do not deviate, further the first and second barrel are fixed to the housing, a guide groove is formed on one side of the housing to receive the extended part of the first and second housing so that the first and second housing can be slid (hereafter referred to as prior art 8). In the prior art 8, the rotation of the gear connected to the rotation shaft of the motor is converted to vertical and horizontal motion and the distance between the first barrel and the second barrel is adjusted.

However, the device disclosed in patent literature 1 is related to a camera module for a video camera, gives no consideration to downsize it to be installed in a portable terminal, a drive motor is located remote from the optical system in an ample space inside the camera module, and the motor is mounted at a position apart from the optical system with an efficient space secured. The device disclosed in patent literature 2 is related to a small sized camera module to be integrated in a portable terminal, etc., but it is manual operation type and can not be applied to a camera module in which zooming and autofocusing are performed by means of a motor.

The structure disclosed in patent literature 3, 4 is for providing a light shielding plate and not informative as structure for downsizing a camera module.

According to the driving mechanism disclosed in patent literature 5, it is required to provide two motors, i.e. a motor which serves both for film feeding and autofocusing and a motor for zooming, resulting in an increased size as a camera module to be equipped to a portable terminal.

Patent literature 6 and 7 each discloses a structure for mounting a driving motor of relatively large size and aims to reduce noise and vibration, not relates to a structure for mounting a small motor with good accuracy. To fix the motor to the motor holder by means of an adhesive agent and fix the motor holder by means of bolts as disclosed results in increased size of parts around the motor, in increased number of parts, and in increased cost.

Prior art 1 and 4 aims to downsize the camera module, but lead screws are provided separately for autofocussing and zooming, so the camera module inevitably increases in size. The camera module of prior art 2 is of pan-focus type and not informative for a module with an autofocusing function incorporated.

According to prior art 3, the space of lens barrel is utilized efficiently, however, it is featured only in that the subject side lens is retained in the housing thereof and the supporting part of the lens frames is provided in the housing, a driving device such as a motor is not integrated, and it is difficult to find it informative for composing a camera module. According to prior art 5, a driving mechanism and CCD are attached to separate housings and assembly process becomes complicated, so that they can not serve as a useful reference for composing a small sized camera module.

With prior art 7, the structure is complicated and the assembling of camera module becomes difficult. In a small camera module equipped to a portable terminal, each of the constituent parts is very small. Therefore, when a cylindrical step motor is located astride of the aperture position in the space below the rear lens group and front lens group, it is very hard and vexatious to mount and fix the cylindrical step motor to the housing of the camera module.

In prior art 8, there is no description about steps of procedure of assembling the camera module. Considering that each of the constituent parts is very small in a small camera module equipped to a portable terminal, work operation of assembling the camera module becomes very complicated depending on the relation of position of the first and second barrel.

SUMMARY OF THE INVENTION

The object of the present invention is to provide a camera module which can be constructed small in size and light in weight even if the function of autofocusing (AF) and/or zooming is incorporated, with the construction a lens moving mechanism being able to be assembled and adjusted easily and accurately, and further can be manufactured at low cost with the casing thereof constructed strong enough, and a portable terminal equipped with the camera module.

To achieve the object mentioned above, the present invention proposes a camera module comprising accommodated in the casing thereof an optical lens system and a lens moving mechanism for moving a plurality of lenses of the optical lens system in a predetermined direction in order to perform focal adjustment and/or to change image magnification, wherein the lenses are mounted to one of the housings composing the casing, part of lens mounting-side side wall of said housing is thick-walled, guide shafts for guiding the movement of said optical lenses are located in the vicinity of the inside fringe part of said housing, and opening parts formed in said guide shafts-side side walls of said housing are covered with cover plates.

The lenses are mounted to one of the housings composing the casing, part of lens mounting-side sidewall of said housing is thick-walled, a cylindrical cam composing said lens moving mechanism is located in the vicinity of the inside fringe part of said housing, and an opening part formed in said cylindrical cam-side side wall of said housing is covered with a cover plate.

The invention proposes a camera module comprising: an optical lens system, a lens moving mechanism for moving moving-lenses in said optical lens system in a predetermined direction in order to perform focal adjustment and/or to change image magnification, a lens holder or holders for retaining said moving lenses, a first housing composing the casing of the camera module to which said lens moving mechanism and said lens holder or holders are mounted retaining at least a part of the lenses of said optical lens system and having a first side wall which is located at said lens retaining part side and formed to have at least partially thick-walled part and a second side wall, a second housing to which a driving source for driving said lens moving mechanism is attached, a first and a second opening part defined in said first and/or said second housing, guide shafts located at side end parts of said first wall of said first housing for guiding the movement of said lens holder or holders, a cylindrical cam located at a fringe part of said second opening part of said first housing in the vicinity of the periphery of said lens holder or holders for moving said lens holder or holders in the direction of the optical direction, and cover plates for covering said first and second opening parts.

A guide shaft attaching part for attaching said guide shafts and a bearing part for supporting an end part of said cylindrical cam are formed in one piece with said first housing, and a shaft body for supporting the other end part of said cylindrical cam is formed in one piece with said second housing.

The guide shafts for guiding the movement of the lens holder or holders are located in the vicinity of both end sides of the thick wall, each end side defining one side of the first and second opening. A cylindrical cam having cam face or faces for moving said lens holder or holders in the direction of the optical axis is located in the vicinity of the guide shaft located near the fringe part of said second opening part.

Said second housing has an opening part in one of the side walls thereof, a driving source positioning part being defined inside the wall where said opening part is formed for attaching and fixing said driving source, and an opening in another side wall for attaching a sensor for detecting the rotation position or rotation angle or rotated angles of said cylindrical cam composing said lens moving mechanism.

The wall near said opening part for attaching said driving source is formed thin so that the outer surface of the driving source attached there does not protrude out of the outer surface of the wall but is near level with the outer surface of the wall, and the driving source is fixed to the inner surface of the wall by means of an adhesive agent with the peripheral surface of the driving source brought into contact with said inner surface.

To said second housing are provided an opening part in the side wall opposing to said opening part for positioning said driving source in addition to said opening part for positioning said driving source and said opening for attaching said sensor.

Said cylindrical cam is located in the vicinity of said lens holder or holders and said sensor is located at said opening for attaching said sensor. A band mounted with said sensor serves as a cover plate to cover said opening for attaching the sensor.

Gears are arranged between said driving source and said cylindrical cam for transmitting the driving force of said driving source to said cylindrical cam.

The optical axis of the optical lens system and the center axis of said cylindrical cam are parallel to each other. The opening part where a driving source positioning part is defined inside the wall of the second housing is defined such that both sides of the opening part is thin-walled, and the opening part is covered with a cover plate.

The width of the opening part where a driving source positioning part is defined inside the wall of the second housing is smaller than the width of said driving source, and the shape of the opening part is defined to be about the same as the shape of the peripheral surface of the driving source so that the peripheral surface of the driving source can be brought into contact with the opening part for the driving source to be bonded there. Here, the shape of the opening part means to include also the shape of the cross section of the opening part, and 'about the same as the shape of the peripheral surface of the driving source' means that at least the shapes of both sides and the shape of at least part of the cross section of the opening part are about the same as the shape of the peripheral surface of the driving source.

A supporting face is provided at the bottom of the opening part where a driving source positioning part is defined inside the wall of the second housing for allowing the driving source to contact there so that the position of the driving source in the direction of the optical axis is determined.

The depth of said casing in a plane perpendicular to the optical axis of the optical lens system is about the same as the sum of the cylindrical cam and the thickness (length in said depth direction) of the driving source.

The present invention proposes a portable terminal containing:

a camera module comprising; an optical lens system, a lens moving mechanism for moving moving-lenses in said optical lens system in a predetermined direction in order to perform focal adjustment and/or to change image magnification, a lens holder or holders for retaining said moving lenses, a first housing composing the casing of the camera module to which said lens moving mechanism and said lens holder or holders are mounted retaining at least a part of the lenses of said optical lens system and having a first side wall which is located at said lens retaining part side and formed to have at least partially thick-walled part and a second side wall, a second housing to which a driving source for driving said lens moving mechanism is attached, a first and a second opening part defined in said first and/or said second housing, guide shafts located at side end parts of said first wall of said first housing for guiding the movement of said lens holder or holders, a cylindrical cam located at a fringe part of said second opening part of said first housing in the vicinity of the periphery of said lens holder or holders for moving said lens holder or holders in the direction of the optical direction, and cover plates for covering said first and second opening parts;

a case body equipped with said camera module; and an operation portion provided to said case body for manipulating the lens moving mechanism of said camera module.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
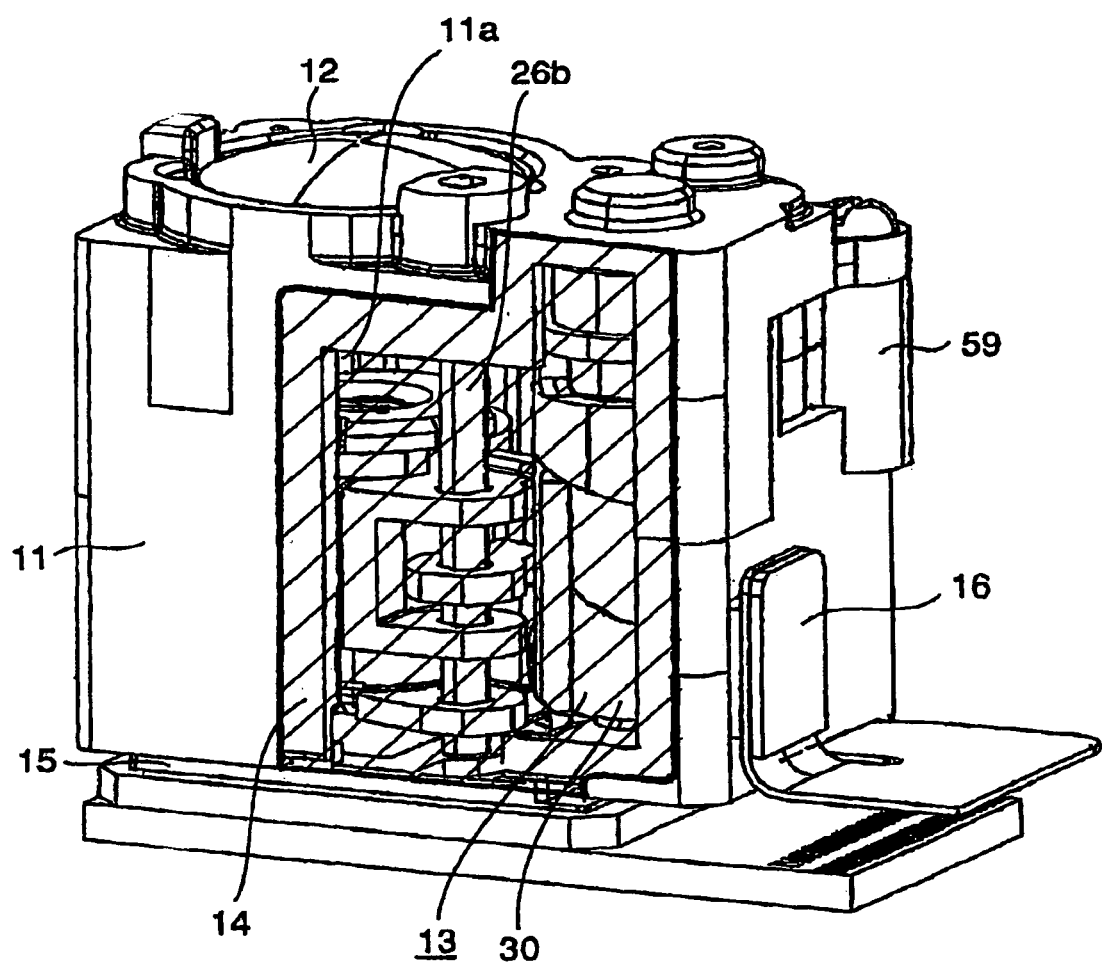
FIG. 1 is a perspective view of an embodiment of the camera module according to the present invention.
Figure 2:
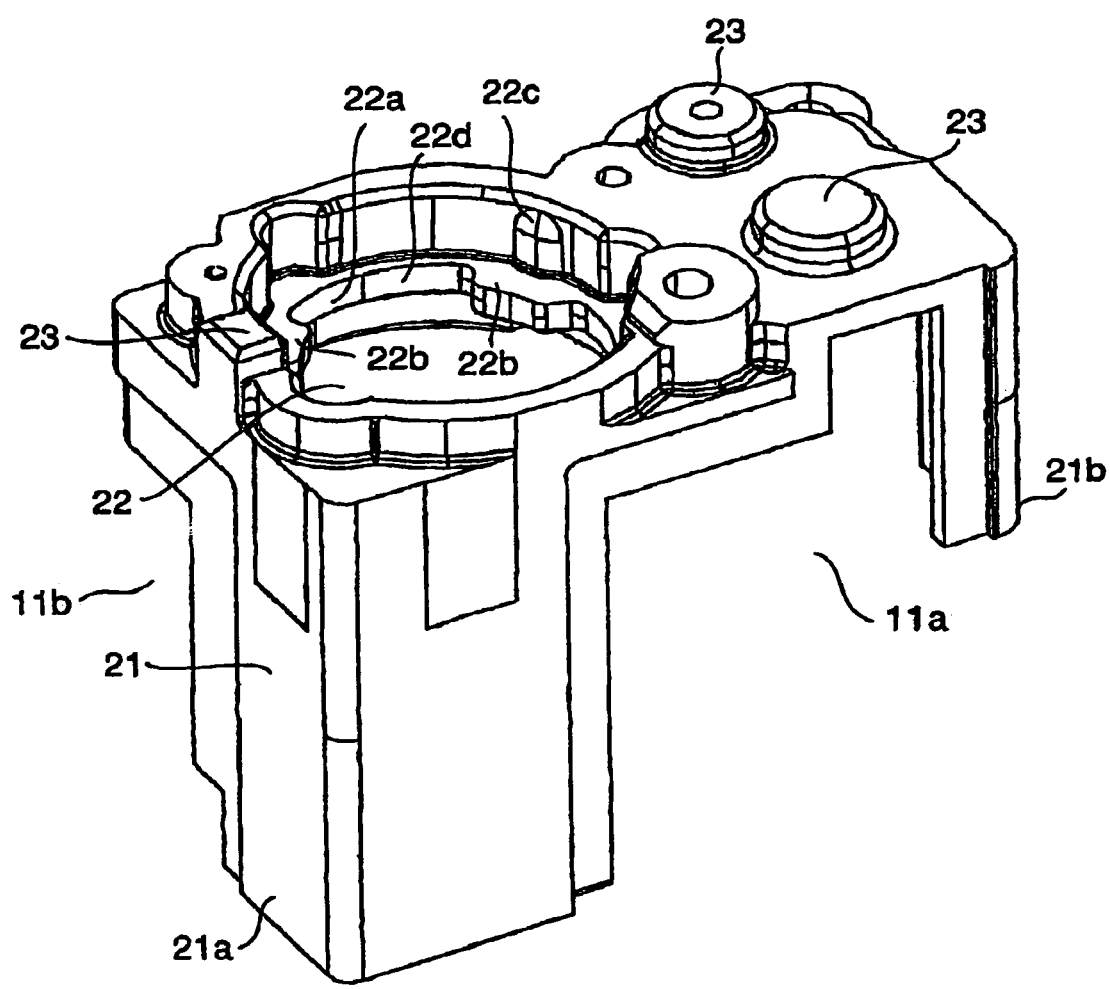
FIG. 2 is a perspective view of the first housing of the casing of the embodiment of the camera module according to the present invention.
Figure 3:
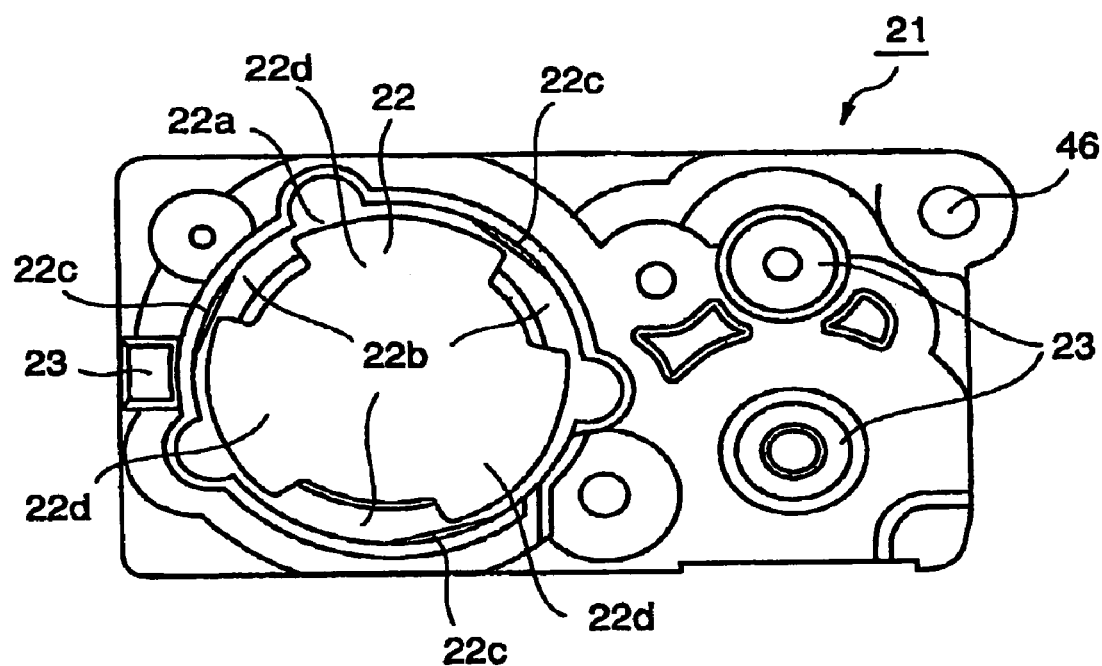
FIG. 3 is a plan view of the first housing of FIG. 2.
Figure 4:
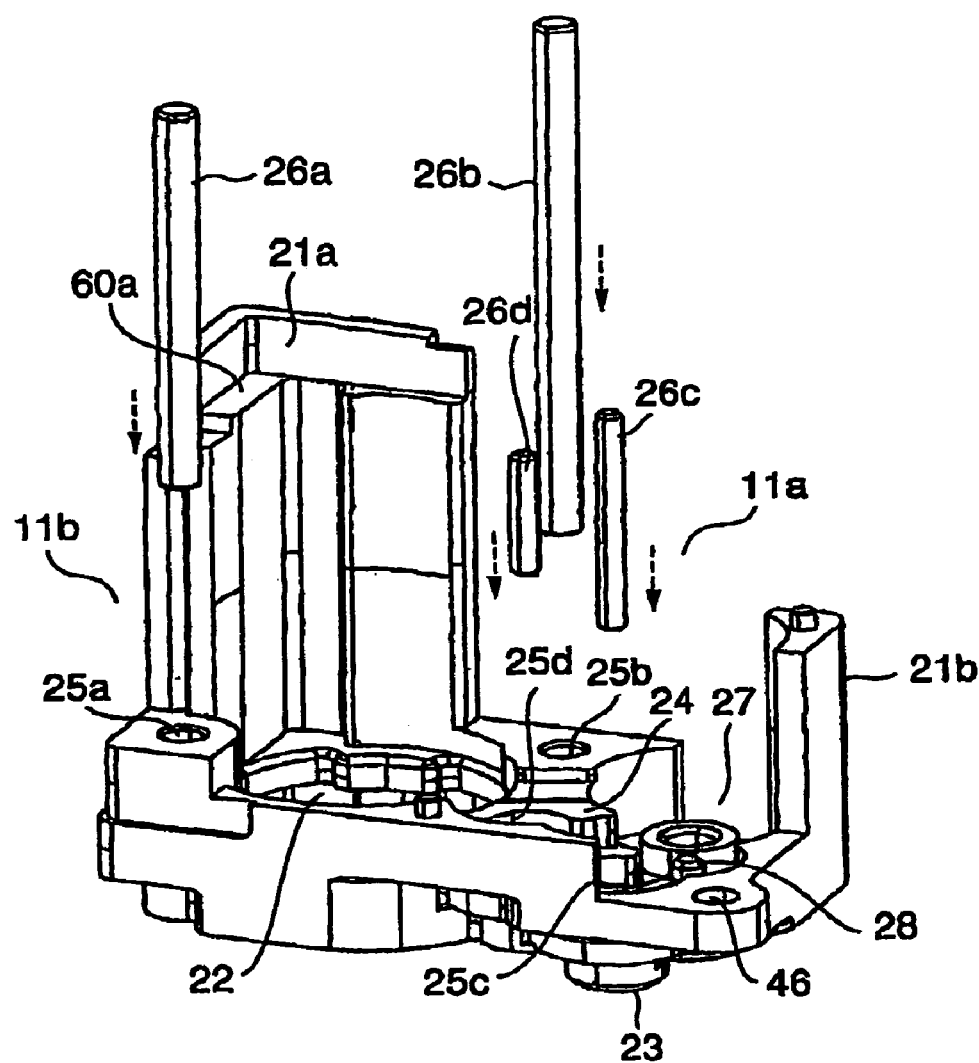
FIG. 4 is a perspective view showing the state when guide shafts and gear shafts are being attached to the first housing of FIG. 2.
Figure 5:
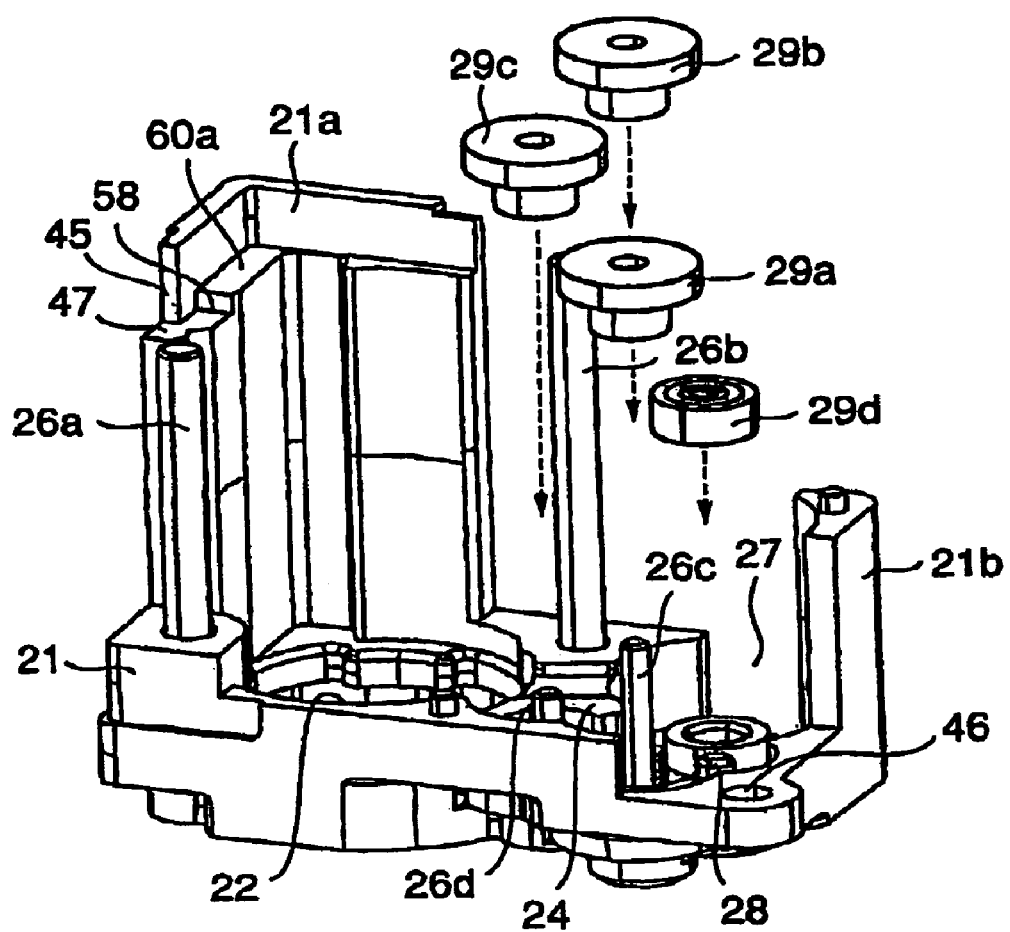
FIG. 5 is a perspective view showing the state when gears are being fitted rotatably to the gear shafts shown in FIG. 4.
Figure 6:
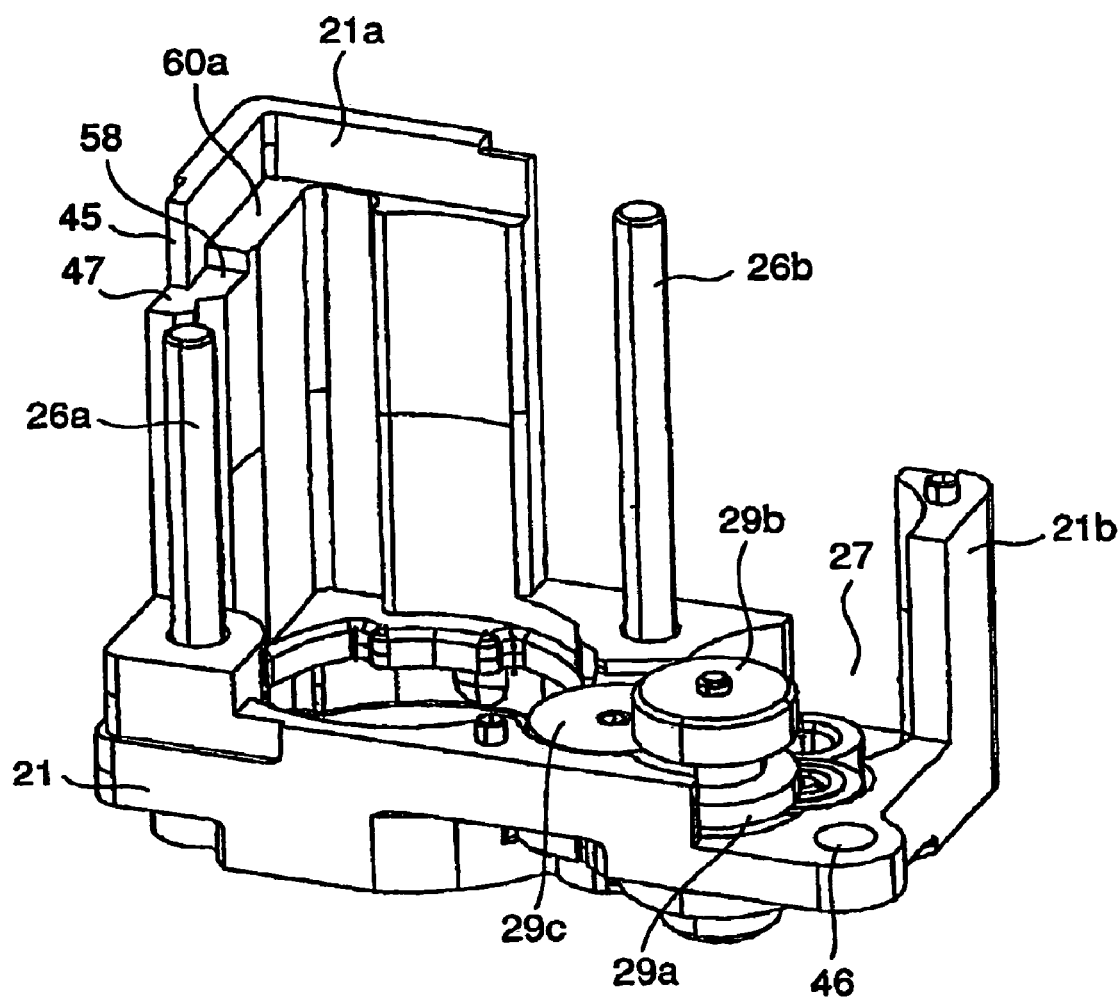
FIG. 6 is a perspective view showing the state when gears have been fitted rotatably to the gear shafts shown in FIG. 4.
Figure 7:
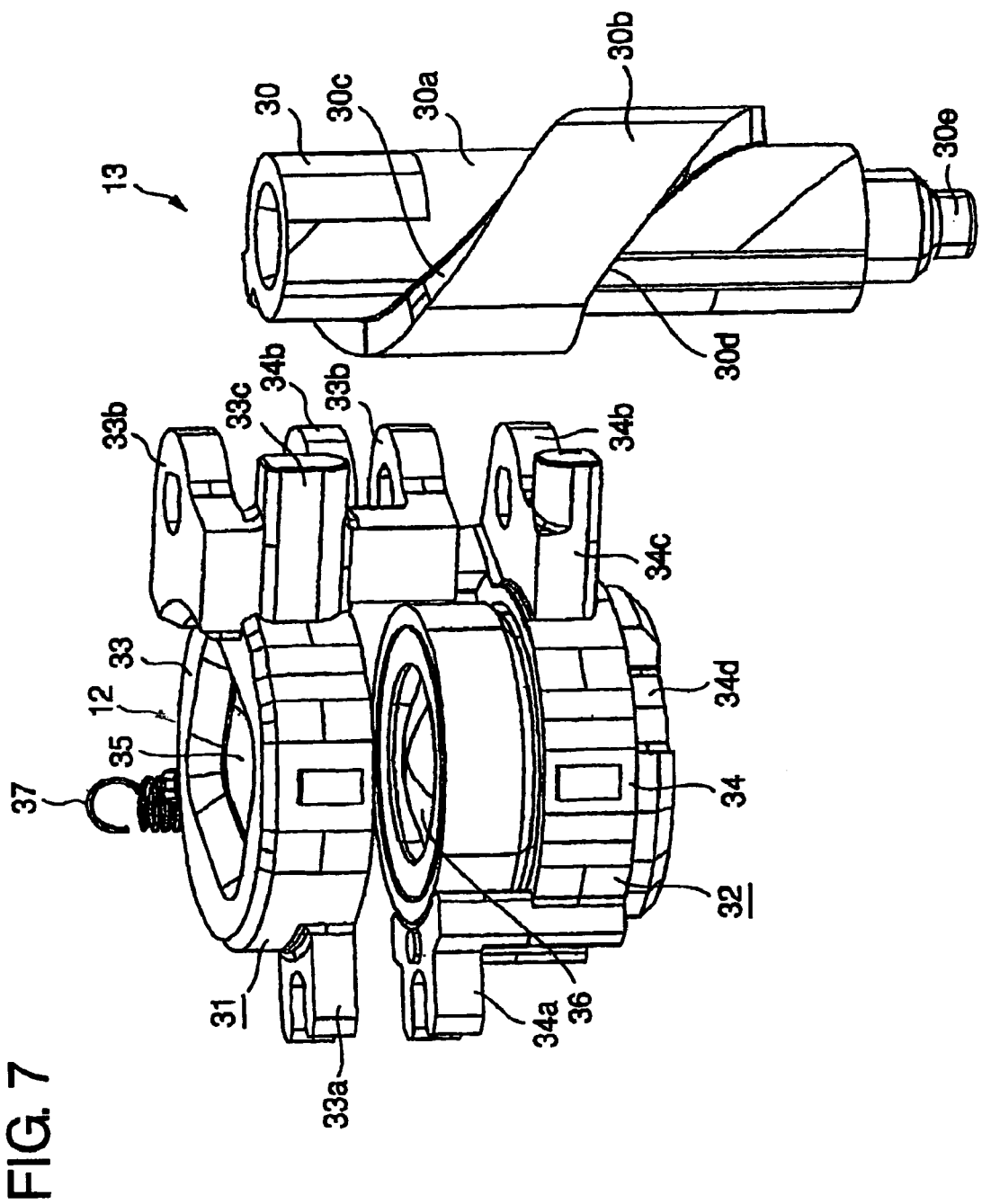
FIG. 7 is a perspective view of moving the lens assemblies and cylindrical cam of the camera module according to the present invention.
Figure 8:
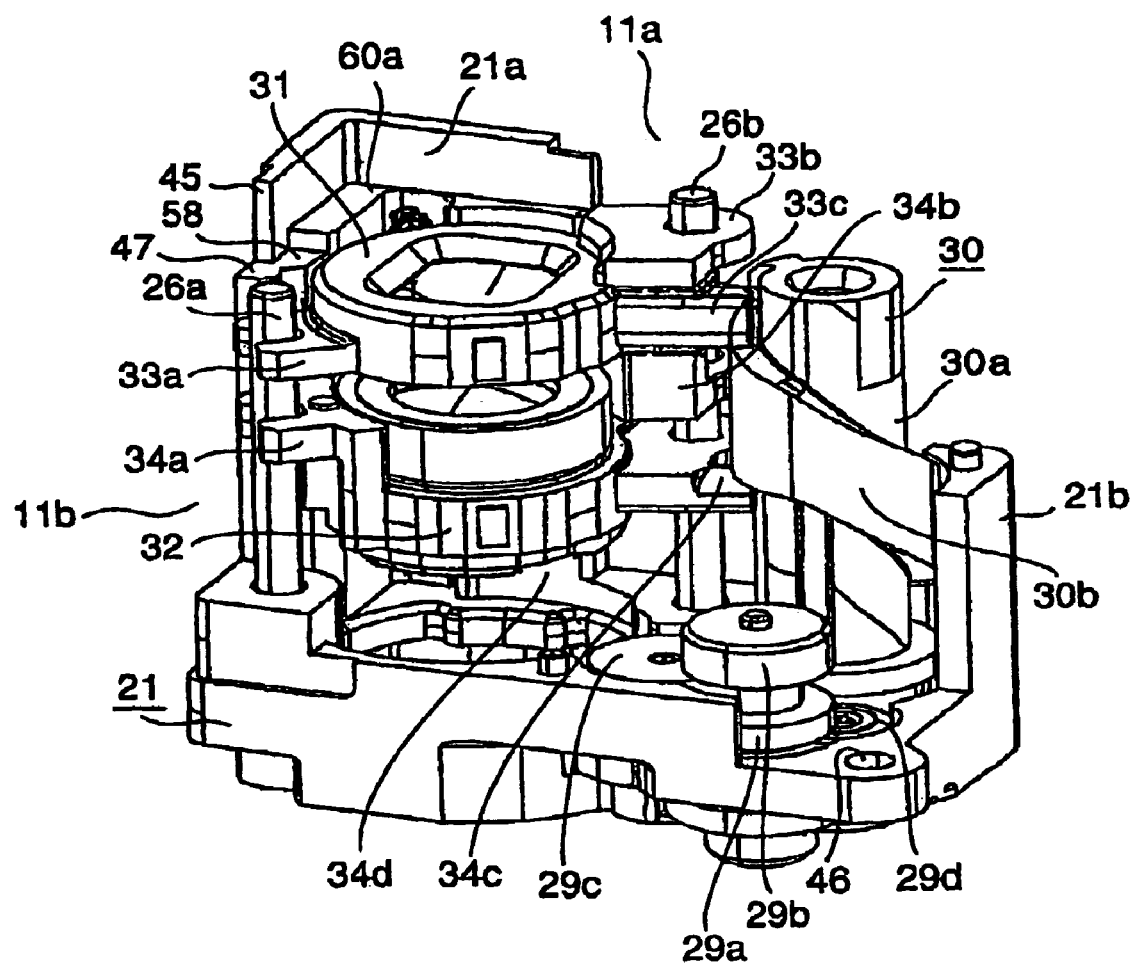
FIG. 8 is a perspective view showing when the moving lens assemblies and cylindrical cam of FIG. 7 are attached to the first housing.
Figure 9A:
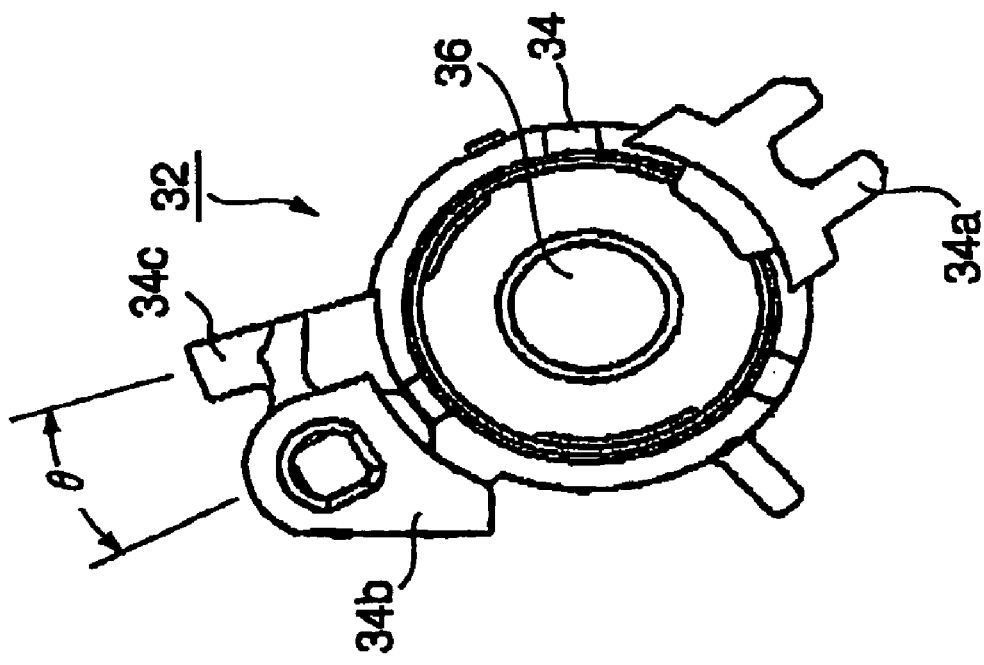
FIG. 9(A) is a top view of one of lens holders.
Figure 9B:
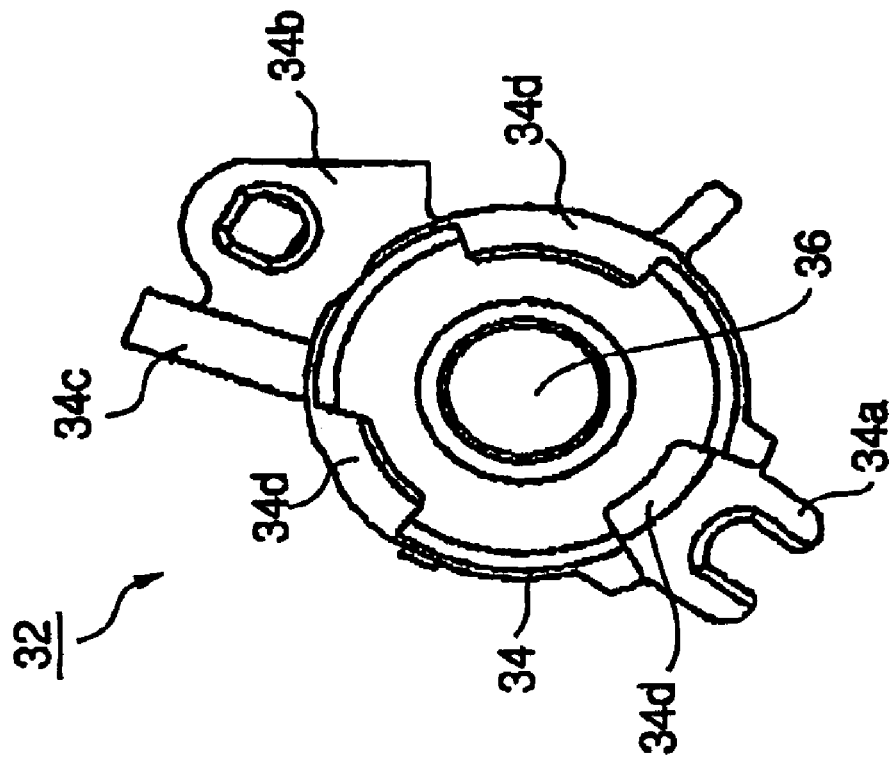
FIG. 9(B) is a bottom view of the lens holder.
Figure 10:
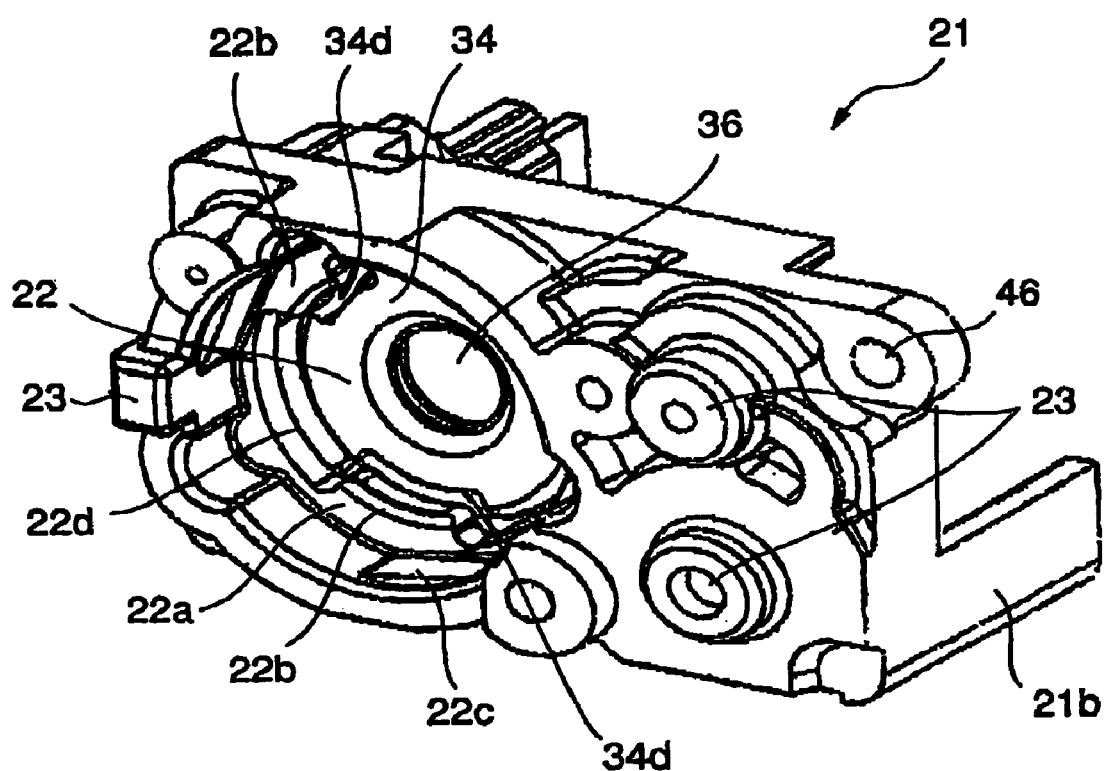
FIG. 10 a perspective view showing the state when the lens holder of FIG. 9(A) is mounted to the first housing.
Figure 11:
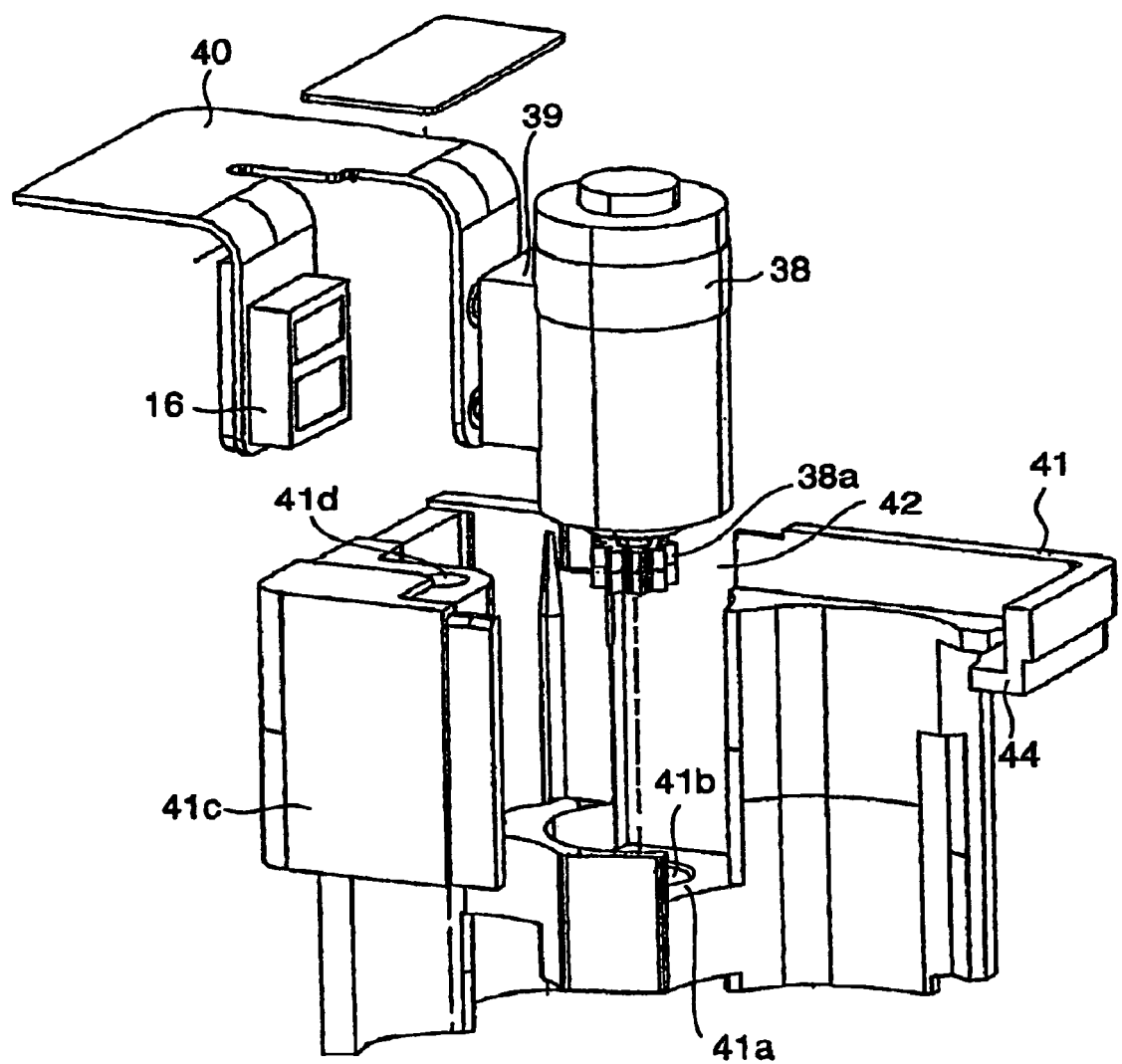
FIG. 11 is a perspective view of the second housing together with the drive motor to be fixed to the second housing and the flexible band attached with an optical sensor and attached to the drive motor.
Figure 12:
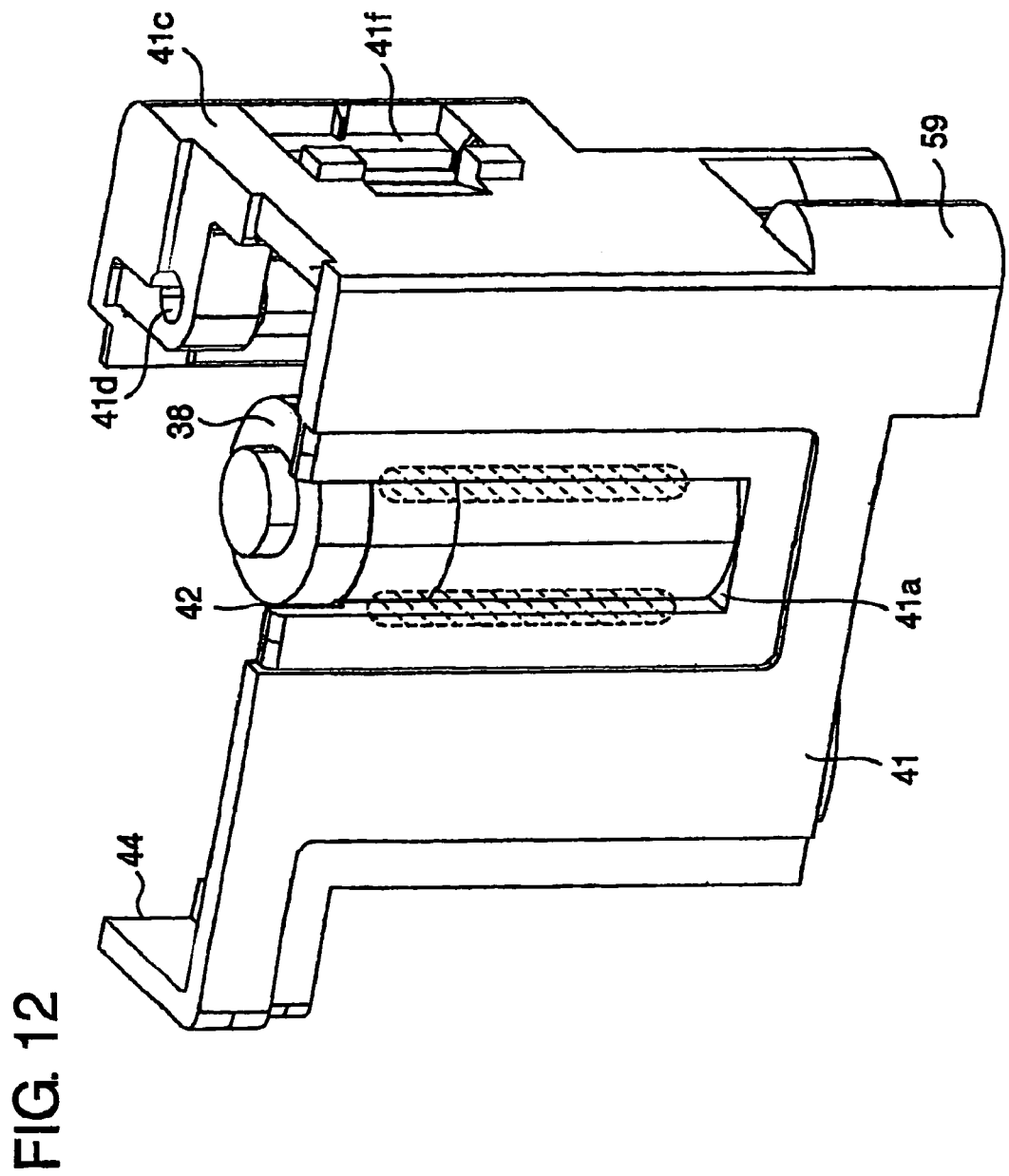
FIG. 12 is a perspective view of the second housing showing the state when the drive motor is fixed thereto facing to the cut-out opening part thereof.
Figure 13:
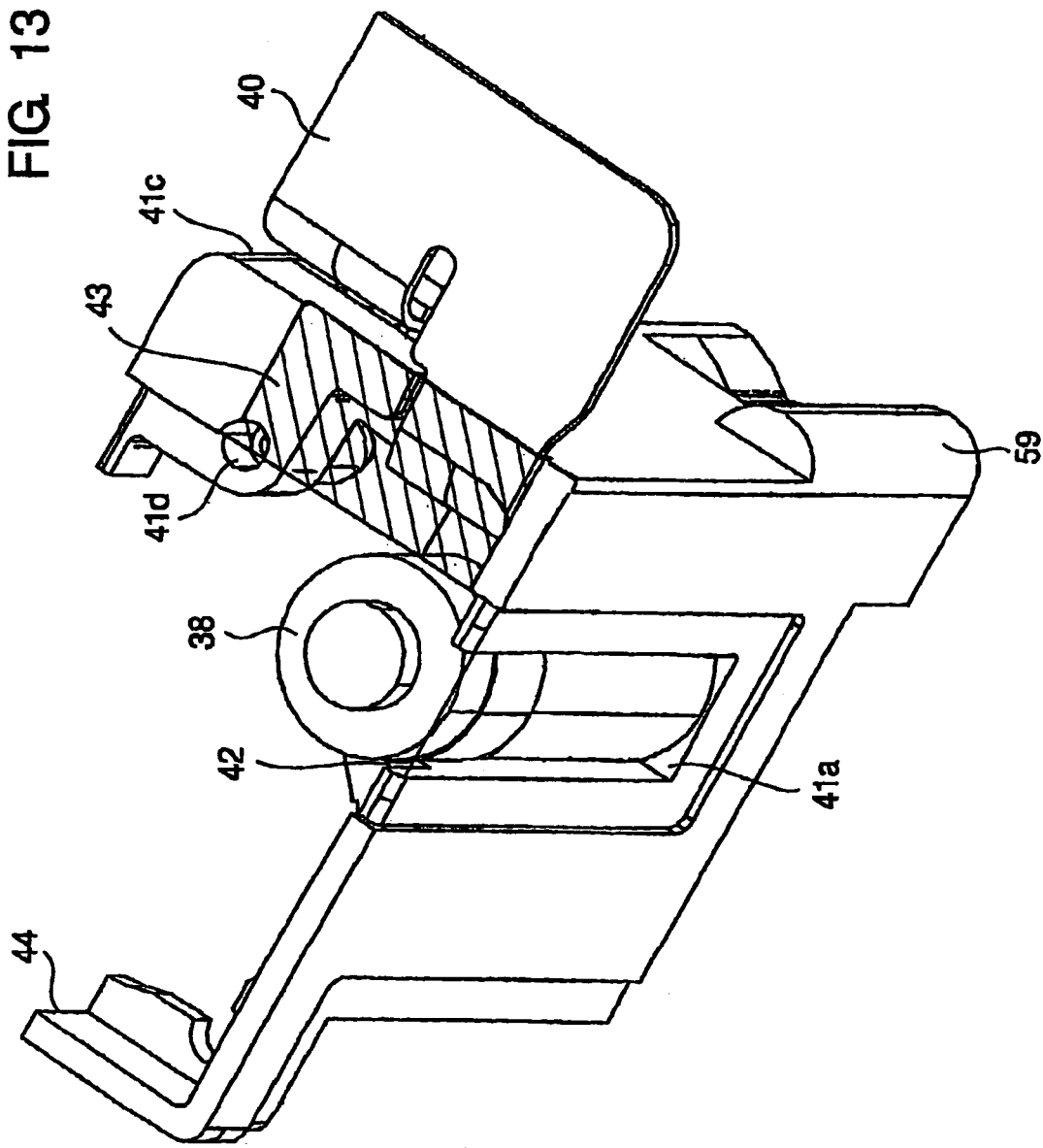
FIG. 13 is a perspective view of the second housing showing the state when the drive motor is fixed thereto facing to the cut-out opening part thereof together with the flexible band attached to the drive motor.
Figure 14:
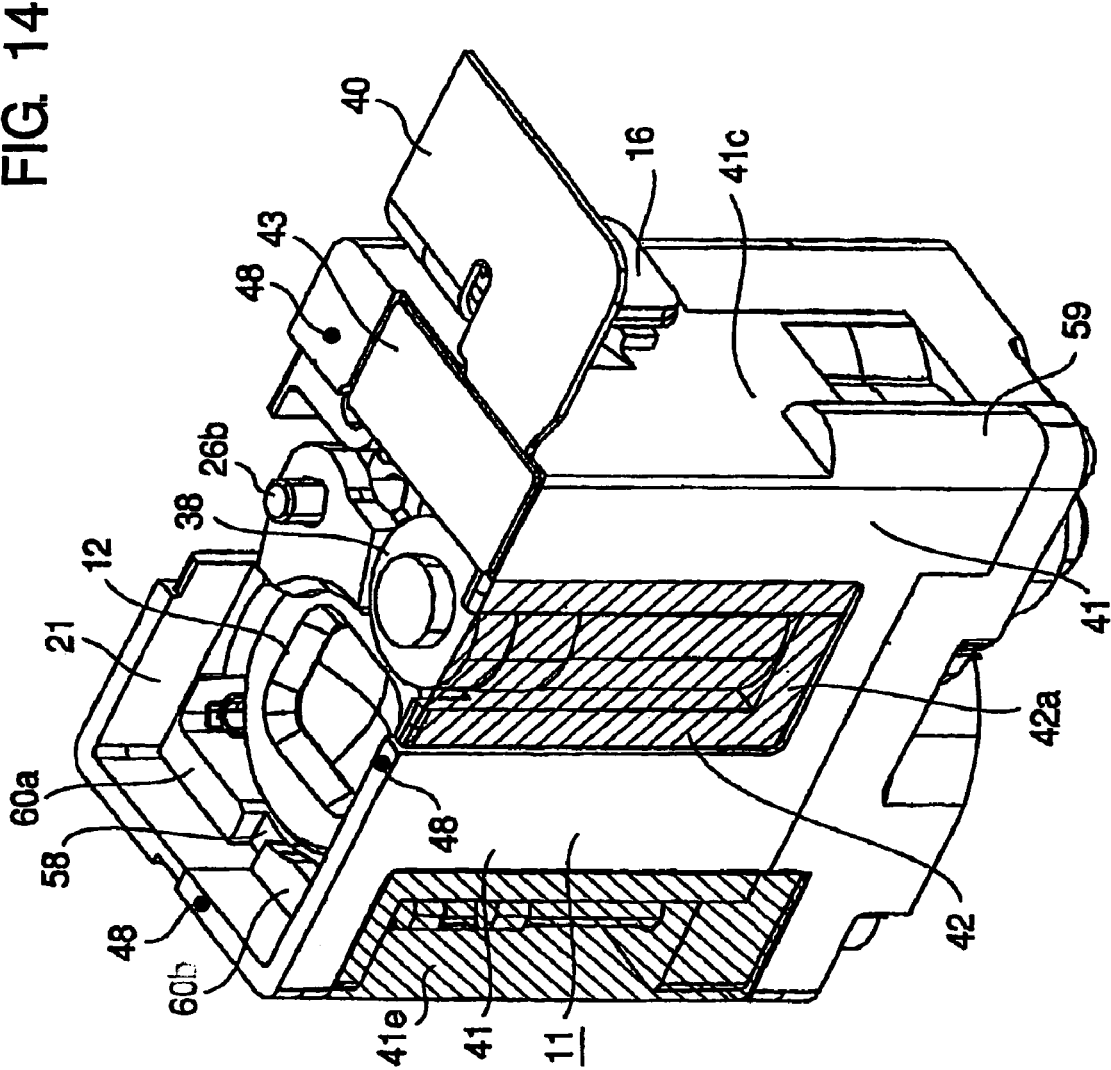
FIG. 14 is a perspective view of the camera module before the CCD is attached for explaining attaching thereof.
Figure 15:
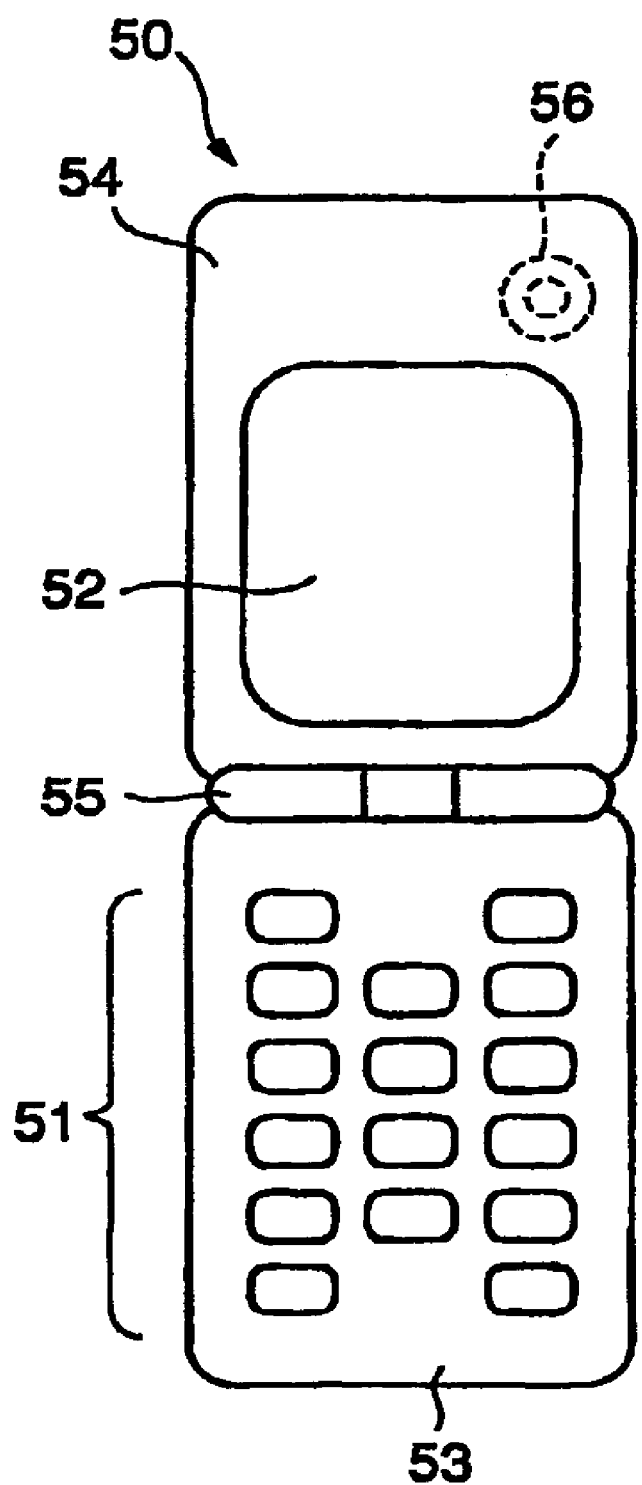
FIG. 15 is a schematic view of the portable terminal installed with the camera module according to the present invention.

FIG. 1 is a perspective view of an embodiment of the camera module according to the present invention, FIG. 2 is a perspective view of the first housing of the casing of the embodiment of the camera module according to the present invention, FIG. 3 is a plan view of the first housing of FIG. 2, FIG. 4 is a perspective view showing the state when guide shafts and gear shafts are being attached to the first housing of FIG. 2, FIG. 5 is a perspective view showing the state when gears are being fitted rotatably to the gear shafts shown in FIG. 4, FIG. 6 is a perspective view showing the state when gears have been fitted rotatably to the gear shafts shown in FIG. 4, FIG. 7 is a perspective view of moving the lens assemblies and cylindrical cam of the camera module according to the present invention, FIG. 8 is a perspective view showing when the moving lens assemblies and cylindrical cam of FIG. 7 are attached to the first housing, FIG. 9(A) is a top view of one of lens holders and FIG. 9(B) is a bottom view of the lens holder, FIG. 10 a perspective view showing the state when the lens holder of FIG. 9(A) is mounted to the first housing, FIG. 11 is a perspective view of the second housing together with the drive motor to be fixed to the second housing and the flexible band attached with a optical sensor and attached to the drive motor, FIG. 12 is a perspective view of the second housing showing the state when the drive motor is fixed thereto facing to the cut-out opening part thereof, FIG. 13 is a perspective view of the second housing showing the state when the drive motor is fixed thereto facing to the cut-out opening part thereof together with the flexible band attached to the drive motor, FIG. 14 is a perspective view of the camera module before the CCD is attached for explaining attaching thereof, and FIG. 15 is a schematic view of the portable terminal installed with the camera module according to the present invention.

In the drawings, the same component is indicated by the same reference number. Referring to FIG. 1, reference numeral 11 is a camera casing(hereafter referred to simply as casing) made of, for example, polycarbonate containing fluorine, the casing 11 consisting of a first housing 21 and a second housing 41 (see FIG. 11, 12). Reference numeral 12 is an optical lens system, 13 is a lens moving mechanism, 11a is an opening part of the casing 11, a hatched part indicated by reference numeral 14 is a cover plate (light shielding plate) covering the opening part 11a. Reference numeral 15 is a CCD which is attached to the casing 11 at the lower side thereof in the drawing and by the light received through the optical lens system 12 is converted to an electric signal. Reference numeral 16 is an optical sensor (light emitting device and photoreceptor device) attached to the side of the casing 11. The optical sensor 16 detects the rotation position or rotation angle or rotated angles of the cylindrical cam and the distance of the position of the moving lens group or groups from a reference position is calculated. The optical sensor 16 is attached to a flexible band 40 (see FIG. 11) which also serves as a covering plate to cover an opening 41f provided on a side wall 41c of the second housing 41.

Referring to FIG. 2, FIG. 3, and FIG. 10, reference numeral 21 is the first housing of the casing 11. A first thick side wall part 21a and a second thick side wall part 21b extend from the upper part (base part) of the first housing 21. Cutout opening parts 11a and 11b are defined between the thick side wall parts 21a and 21b. Reference numeral 22 is an opening formed in the base part (upper part in FIG. 2 of the first housing) for retaining the object side fixed lens of the optical lens system (not shown in FIG. 2) of the camera module, 22a is an annular formation extending radially inwardly from the inside surface of the opening 22, and 22b's are reference surfaces on a plurality of protruded portions protruding radially inwardly of the annular formation 22a, in the embodiment three protrusions being formed. Reference numerals 22c's are salient parts for positioning the object side fixed lens so that its center coincides with the center line of the optical lens system, 22d's are concaved portions of the annular formation 22a to allow a lens holder 34 (see FIG. 7) to advance into the space surrounded with the annular formation 22a, and 23's are reference surfaces, which serve as reference surfaces when assembling, on a plurality of protrusions provided on the outer face of the base part of the first housing 21, in the embodiment three protrusions being formed.

In FIG. 4 is shown the first housing of FIG. 2 in an upside-down position. In the drawing, reference numeral 24 is a mounting portion provided near the opening 22 to mount a lens moving mechanism (not shown in FIG. 4) to be mounted to the base part of the first housing 21. On the mounting portion 24 are formed a cam mounting part 27 for mounting a cylindrical cam mentioned later and a shaft body 28 protruding upward near the cam mounting part 27. Reference numerals 25a and 25b are a first and a second hole for fixing a first and a second shaft (guide shafts) respectively, the holes 25a and 25b being provided on the base part near the peripheral part of the opening 22 with angular spacing of about 180° to each other. Reference numerals 25c and 25d are a third and a fourth hole for fixing a third shaft and a fourth shaft respectively. Reference numerals 26a, 26b, 26c, and 26d are a first, a second, a third, and a fourth shaft made of, for example, stainless steel. Among them, the first and second shaft 26a and 26b are guide shafts for guiding moving lens groups(not shown in FIG. 4) of the optical lens system and inserted into the first and second hole 25a and 25b respectively to be fixed there. The third and fourth shaft are inserted into the third and fourth hole 25a and 25b respectively to be fixed there. Reference numeral 46 is a bolt hole for a screw bolt (not shown in the drawing) to fasten the first housing 21 and the second housing 41 (see FIG. 11, 12).

Referring to FIG. 5, reference numerals 29a~29d are gears to be fitted rotatably to the third and fourth shaft 26c and 26d and to the shaft part 28 as indicated by arrows with broken lines. A first gear 29a is fitted rotatably to the third shaft 26c and then a second gear 29b is fitted rotatably to the same on the first gear 29a. A third gear 29c is fitted rotatably to the fourth shaft 26d and a fourth gear 29d is fitted rotatably to the shaft part 28. The second gear 29b meshes with the third gear 29c, the third gear 29c meshes with the first gear 29a, and the first gear 29a meshes with the fourth gear 29d (see FIG. 6). As mentioned later, the gear of a driving motor is allowed to mesh with the second gear 29b and the rotation driving force of the driving motor is transmitted to the cylindrical cam via the gears 29b, 29c, 29a, and 29d (See FIG. 8. In FIG. 6 and FIG. 8. The gear 29b is shown on the way of being fitted rotatably to the shaft 26c, the gear 29b will be pushed down until it meshes with the gear 29c.). Reference numeral 45 is a side end face of the side wall part 21a of the first housing 21, where a side end face 44 of the second housing 41 mentioned later is jointed, 47 is an adhesive-joining part for joining the first housing 21 with the second housing 41 with an adhesive agent, the joining part 47 being located at a corner opposing nearly diagonally to the bolt hole 46 of the first housing 21, 58 is a concave formed when the first housing 21 and second housing 41 are assemble and fixed to each other as shown in FIG. 14, the concave 58 serving as a well for retaining an adhesive agent for adhering a board mounted with the CCD 15.

FIG. 7, FIG. 8, and FIG. 9 show moving-lens assemblies and a cylindrical cam, the state they are assembled to the first housing, and a top and bottom view of a moving-lens holder respectively in a state the camera casing in FIGS. 1, 2 is turned upside-down. In the drawings, reference numeral 30 is a cylindrical cam for driving a lens moving mechanism 13 assembled to the first housing 21. The cylindrical cam 30 has a cylindrical part 30a, a spiral formation 30b around the periphery, and a journal 30e at the lower end. On the spiral formation 30b are defined an upper spiral cam face 30c and a lower spiral cam face 30d. The upper spiral face 30c is a cam face for zoom focusing, and the lower spiral face 30d is a cam face for zooming. The journal 30e is inserted into a bearing bore provided in the cam mounting part 27 of the first housing 21. The cylindrical cam 30 is provided with a bearing hole in the upper end part thereof to receive a shaft part formed in the second housing 41 as explained later to support the upper side of the cylindrical cam 30 for rotation. On the cylindrical part 30a of the cylindrical cam 30 is defined a reference line extending in the vertical direction in FIG. 2, although not shown in FIG. 7, the reference line being different, for example, in color from the color of the peripheral surface of the cylindrical part 30a.

Reference numeral 31 and 32 are a first lens assembly and a second lens assembly respectively having moving lenses attached thereto, 33 and 34 are lens holders of the first and second lens assembly respectively. Reference numeral 33a and 33b's are supporting arms of the lens holder 33, the arms 33a and 33b's extending from the periphery of the lens holder 33 radially outwardly, and 33c is a cam follower arm to be brought into contact with the upper spiral cam face 30c, the cam follower arm 33c also extending from the periphery of the lens holder 33 radially outwardly. Reference numeral 34a and 34b's are supporting arms of the lens holder 34, the arms 34a and 34b's extending from the periphery of the lens holder 34 radially outwardly, and 34c is a cam follower arm to be brought into contact with the lower spiral cam face 30d, the cam follower arm 34c also extending from the periphery of the lens holder 34 radially outwardly. Reference numeral 34d's are depressions (second concave portions) formed on the periphery of the lower part of the lens holder 34, which can be recognized clearly in FIG. 9(A). By virtue of the depressions 34's, the lens holder 34 can be advanced near to the object side fixed lens without interfering with the protruded portions of the annular formation 22a in FIG. 2. Reference numeral 35 and 36 are moving lens groups retained by the lens holders 33 and 34 respectively, and 37 is a spring member connected to the lens holders 33 and 34 so that the holders pull one another.

The lens holder 33 has the supporting arms 33a and 33b's extending radially from the periphery of the lens holder in the direction substantially opposite to each other, the supporting arms 33b's being a pair of arms with a certain distance apart from each of the arms in the direction of the center axis of the lens holder (optical axis direction). The lens holder 34 has the supporting arms 34a and 34b's also extending radially from the periphery of the lens holder in the direction substantially opposite to each other, the supporting arms 34b's being a pair of arms with a certain distance apart from each of the arms in the direction of the center axis of the lens holder (optical axis direction). Further, the lens holder 33 and 34 has the cam follower arm 33c and 34c respectively extending radially in the direction different by a certain angle θ (see FIG. 9(B)) from that of each pair of supporting arms adjacent to each pair of supporting arms. The cam follower arms 33c and 34c are formed such that the arm 33c overlaps with the pair of arms 33b's and the arm 34c overlaps one of the arms 34b's at least partially.

Referring to FIG. 11, FIG. 12, and FIG. 13, reference numeral 38 is a driving motor (stepping motor, for example) composing the lens moving mechanism 13, and 38a is a gear attached to the motor shaft of the driving motor 38. The driving motor 38 is located above the third gear 29c with the gear 38a-side down in FIG. 11 so that the gear 38a meshes with the second gear 29b shown in FIG. 8. Reference numeral 39 is a boss provided on a peripheral part of the driving motor 38 for attaching one of branched parts of the flexible band 40. The optical sensor 16 is attached to the other of branched parts of the flexible band 40 to face to the cylindrical cam 30. The flexible band 40 is bent in the direction perpendicular to the optical axis to be extended outward of the second housing 41 to which the driving motor 38 is attached.

Reference numeral 41a is a supporting face for supporting an end of the driving motor 38 to define the vertical position thereof, and 41b is an opening at the supporting face 41a for inserting the gear 38a of the driving motor 38 which meshes with the third gear 29c. Reference numeral 41c is a side wall of the second housing 41. An overhanging section is formed at an upper corner of the side wall 41c, and a shaft part is formed to protrude downward from the overhanging section, reference numeral 41d indicating a lightening hole of the shaft part. The upper side of the cylindrical cam 30 is supported rotatably by this shaft part by fitting the bearing hole provided in the upper part thereof as mentioned before. Reference numeral 41f is an opening for allowing the optical sensor for detecting the reference line on the cylindrical cam to face the cylindrical cam 30, and 42 is a cutout opening part extending vertically on a side wall of the second housing 41 with the upper side thereof open (see FIGS. 12, 13, and 14).

Further, the side wall of the second housing 41 is thin near the cutout opening part 42, and the width of the cutout opening part 42 is smaller the diameter of the driving motor 38. Further, the second housing 41 has cutout parts on its side in addition to the opening 41f and cutout opening part 42 to define cutout opening parts 11a and 11b when the second housing 41 is assembled to the first housing 21 as shown in FIG. 2. The depth of the second housing 41 in a plane perpendicular to the center axis of the lens holders 33 and 34 (optical axis) is about the same as the sum of the diameter of the cylindrical cam 30 and the diameter of the driving motor 38. A hatched part 43 in FIG. 13 is a cover plate to cover the portion the flexible band 40 is drawn out of the second housing 41. Reference numeral 44 is a side end face of the second housing 41 to be joined to the side end face 45 of the side wall part 21a of the first housing 21, and 59 is a boss for providing a screw hole corresponding to the bolt hole 46 of the first housing 21 to fix the first housing 21 to the second housing 41 by means of a screw bolt.

FIG. 14 shows a perspective view of the state the second housing is attached to the first housing and moving lens assemblies and driving motor 38 are assembled to the housings. In the drawing, a hatched part indicated by reference numeral 42a is a cover plate covering the cutout opening part 42 for light shielding, a hatched part indicated by reference numeral 42e is a cover plate covering the cutout opening part 11b for light shielding. Reference numeral 48's are reference points for measurement when the CCD 15 shown in FIG. 1 is fixed, and 60a and 60b are image pickup device attaching parts for bonding a board mounted with the CCD 15. Referring to FIG. 15, reference numeral 50 is a portable telephone as an example of portable terminal, 51 is an operating portion, 52 is a display made of liquid crystal for example, 53 is a first case part equipped with the operation portion 51, 54 is a second case part equipped with the display 52, 55 is a hinge mechanism, and 56 is a camera module.

The substantially circular opening 22 for retaining the object side fixed lens is provided to the base part of rectangular shape of the first housing 21 composing the casing 11 of the camera module of the embodiment in the place near to one side in the direction of longer side of the base part, a first sidewall 21a, which is generally thick but has partially thin part, extends from a corner part near the opening of the base part, and a second side wall 21b, which is generally thick, extends from a corner part opposing to the corner part near the opening in the direction of longer side of the base part. Between the side walls are formed a first cutout opening part 11a (see FIG. 1) and a second cutout part 11b (see FIGS. 2, 4). When the second housing 41 is joined with the first housing, the contour of each of the first and second cutout openings is defined.

The guide shaft 26a is attached to the base part at a corner part opposite to the first side wall in the direction of shorter side of the base part, and the guide shaft 26b is attached to the base part at a part diagonally opposite to the center of the opening 22. The cylindrical cam 30 for moving the lens holder 33, 34 is located in the vicinity of the guide shaft 26b (see FIG. 8) toward the direction of longer side of the base part. The driving motor 38 attached to the second housing is located in the vicinity of the cylindrical cam 30 toward the direction of shorter side of the base part when the first and second housing is joined. The cutout openings 11a and 11b are covered with the cover plate 14 and 41e respectively.

Therefore, by providing cutout openings 11a, 11b in the casing 11 which are covered with thin cover plates 41, 41e, and locating the guide shafts 26a, 26b for guiding the lens holders 33, 34 and the cylindrical cam 30 at fringe parts inside the casing, the camera module can be composed small in size as against the case the first housing 21 is formed to have thick side walls all around its periphery to secure strength. Further, as cutout openings are provided in the side walls of the casing 11, adjustment of lens moving mechanism, etc. can be performed from the side openings. In the way like this, a small and light camera module with auto-focusing (AF) and/or zooming function incorporated can be provided.

In the embodiment of the camera module of FIG. 1, the camera casing 11 (hereafter referred to as the casing) is made of, for example, resin such as polycarbonate containing fluorine to increase durability and improve sliding property, the casing being composed of the first housing 21 shown in FIG. 2 to which the lens moving mechanism 13 is mounted and the second housing 41 to which the motor 38 shown in FIG. 12 is attached; and the board mounted with the CCD 15 for picking up images, optical sensor 16 consisting of a light emitting device and a photoreceptor device, and cover plates (light shielding member) such as indicated by reference numerals 14, 41e are attached to the casing to compose the camera module to be small in size to be used as an image pickup device for the portable telephone 50 shown in FIG. 15 as an example of portable terminals. Shooting and zooming operation of the camera module can be done by manipulating the operating portion 51 shown in FIG. 15.

FIG. 15 is a plan view of the portable telephone 50 shown in a state the operating portion 51 and display 52 are viewable (opened state); the first case 53 equipped with the operating portion 51 and the second case 54 mounted with the display 52 are connected with the hinge mechanism 55, and the first and second case 53, 53 can turn around the hinge mechanism 55.

The camera module is mounted to the second case 54 so that the optical lens system 12 is located at the position indicated by a double circle of broken line in the drawing, photographing is done by the camera module by manipulating a designated button on the operating portion 51, and the photographed image is displayed on the display 52. Therefore, the camera module is required to be composed very small in size. Zooming operation of the camera module can be possible by manipulating another designated button of the operating portion 51.

On the inner surface of the opening 22 defined in the base part (upper part in FIG. 2) of the first housing 21 for attaching the object side fixed lens (not shown in FIG. 2) is formed the annular formation 22a extending radially inwardly. The inner surface of the annular formation 22a is formed such that a plurality of protrusions (on the surface of each of which is defined the reference surface 22b) and a plurality of concaved portions 22d exist alternately. The lens holder 34 is provided with depressions 34d's so that the lens holder can advance into the space surrounded by the annular formation without interfering with the protrusions of the annular formation. On the inner surface of the opening 22 are provided salient parts 22c's extending upward from the reference surfaces 22d's. The position of the object side fixed lens in the direction of the optical axis is determined by the reference surfaces 22b and the central position thereof is determined by the salient parts 22c accurately.

The first housing 21 has the first side wall 21a partially thickened and the second thick side wall 21b. Between these side walls are cutout opening parts 11a and 11b. On the upper surface in FIG. 2 of the base part are formed a plurality (three in this case) of reference surfaces 23's protruding upward. These reference surfaces 23 are used as reference surfaces to be brought into contact with the reference surface of an assembly jig (not shown in the drawings) when the lens assemblies and lens moving mechanism are automatically assembled to the first housing 21 with the base-side down in order to secure accuracy in assembling and adjusting. Thus, the assembling becomes easy and automatic assembly itself can be performed very easily and simply.

The mounting portion 24 for mounting the lens moving mechanism (not shown in FIG. 4) is provided in the base part of the first housing 21 adjacent to the opening 22, and further the shaft mounting holes 25a and 25b for mounting the guide shafts 26a and 26b (the first and second shaft) respectively for guiding the lens holders 33 and 34 are provided in the base part at the peripheral part of the opening such that the shaft mounting holes 25a and 25b are positioned at about 180° spacing in the vicinity of both side-ends of the side wall 21a. The shaft mounting holes 25c and 25d are provided in the mounting portion 24 for mounting the shafts 26c and 26d (the third and fourth shaft) for fitting gears rotatably.

To each of the first to fourth holes 25a~25d are inserted the first~fourth shafts 26a~26d made of for example stainless steel from the upside in FIG. 4 of the first housing 21 as indicated by arrows with dotted lines. Near the mounting part 24 in the base part of the first housing are provided the cam mounting part 27 (cam bearing) for supporting the cylindrical cam 30 and the shaft body 28 protruding upward and formed in one piece with the housing. FIG. 5 shows the state the first to fourth shaft 26a~26d are mounted. As indicated by arrows with dotted lines in FIG. 5, the first gear 29a and second gear 29b are fitted to the third shaft 26c. To the fourth shaft 26d is fitted the third gear 29c, which meshes with the first gear 29a. To the shaft body 28 is fitted the last stage gear 29d, which meshes with the first gear and the gear of the cylindrical cam. FIG. 6 shows the state the gears 29a to 29d are assembled. Therefore, there is in the first housing only the cam bearing hole of the cam mounting part 27 as a sliding part.

By making the shaft 26c and 26d of metal, these shafts can be made small in diameter, for the rotation speeds of the gears fitted to the shafts are high but loads are small. As a result, the gears can be reduced in diameter, which effects to reduce the size of the camera module and suppress mechanical noise. The rotation speed of the last stage gear 29d is relatively slow and mechanical noise emitted is also low. As the shaft body 28 to which the last stage gear 29d is fitted is formed in one piece with the first housing and accordingly is made of resin, it is light even if its diameter is increased to secure strength. Although only the shaft for the last gear is made of resin here, the other shafts may be made of resin. By forming the shaft for the last stage gear in one piece with the housing, the number of constituent parts is reduced and assembling man-hours can be reduced.

The lens holders 33, 34 for retaining the moving lenses 35, 36 of the optical lens system 12 are composed as shown in FIG. 7. FIG. 8, and FIG. 9. The lens holder 33 has a supporting arm 33a and a pair of supporting arms 33b's, each being extending radially outwardly from the periphery thereof in directions substantially opposite to each other. Each of the supporting arms 33b's is provided to be located apart to each other by a certain distance in the direction of the optical axis. The lens holder 34 has a supporting arm 34a and a pair of supporting arms 34b's, each being extending radially outwardly from the periphery thereof in directions substantially opposite to each other. Each of the supporting arms 34b's is provided to be located apart to each other by a certain distance in the direction of the optical axis. Each of the lens holders 33 and 34 is provided with a cam follower arm 33c and 34c extending radially outwardly deviated by an angle θ (see FIG. 9(B)) from the direction of the pair of supporting arms 33b's and 34b's and adjacent to the pair of supporting arms 33b's and 34b's respectively, the cam follower arm 33c overlapping with the pair of supporting arms 33b's and the cam follower arm 34c overlapping with one of the supporting arms 34b's at least partially in the direction of the optical axis.

A guide groove is provided in each of the supporting arms 33a and 34a of the lens holders 33 and 34 for fitting slidably to the first shaft (guide shaft) 26a in FIG. 4, and a guide hole is provided in each of the supporting arms 33b's and 34b's for fitting slidably to the second shaft (guide shaft) 26b in FIG. 4. The supporting arms 33b's and 34b's of the lens holders 33 and 34 are formed such that the holders are fitted slidably to the second shaft 26b in a state that one of the supporting arms 33b's and one of the supporting arms 34b's cross each other in the direction of the optical axis, that is, the lower supporting arm of the lens holder 33 is positioned between the upper and lower supporting arms of the lens holder 34. With this composition, the supporting arms 33b's can be formed to be apart by an increased distance to each other and also the supporting arms 34b's can be formed to be apart by an increased distance to each other. Therefore, when forces for moving the lens holders 33 and 34 in the direction of the optical axis exert slantwise in relation to the optical axis on the lens holders 33 and 34 from the spiral cam faces 30c and 30d via the cam follower arms 33c and 34c, the lens holders 33 and 34 can be moved smoothly along the guide shaft 26b, for the tilting of the lens holders caused by the gap between the guide shaft 26b and the guide holes of the supporting arms 33b's and 34b's becomes small by virtue of the increased distance between each of the supporting arms 33b's and between each of the supporting arms 34b's.

The cylindrical cam 30 is a cam member of nearly cylindrical shape made of metal, resin, or resin containing fluorine, etc. and has the cylindrical part 30a and spiral formation 30b defined on the periphery of the cylindrical part 30a. On the spiral formation 30b are defined the zoom focusing face 30c on the upper side thereof in FIG. 7 and zooming face 30d on the lower side thereof in FIG. 7. In the case the cylindrical cam 30 is made of resin, it can be made to have lightweight, strength, and durability, and further in the case it is made of resin containing fluorine, the sliding property of the journal 30e can be improved. The optical lens system of the camera module of the embodiment is an example of a dual focus type, the zooming face 30d is defined such that the second lens assembly 32 for shifting focus point is moved by a predetermined distance by the rotation of the cylindrical cam and after that the lens assembly 32 is not moved by further rotation of the cylindrical cam 30. The zoom focusing face 30c is defined such that the first lens assembly 31 is moved for focusing by the rotation of the cylindrical cam 30 even after the second lens assembly 32 is stopped after it is moved by the predetermined distance.

When the cylindrical cam 30 and the first and second lens assemblies are assembled to the first housing 21, the lower end face of the cam follower arm 33c contacts the focusing face 30c and the upper end face of the cam follower arm 34c contacts the zooming face 30d. The lens holders 33, 34 are connected by means of the spring 37 to be pulling each other. A reference line, although not shown in the drawings, extending in the axial direction of the cylindrical cam 30 is provided on the cylindrical part 30a thereof, the reference line being different, for example, in color from that of the cylindrical part 30a so that the line is detected by the optical sensor 16 shown in FIG. 11 detects the original position of the cylindrical cam 30.

As shown in FIG. 8, when the lens assemblies 31, 32 and cylindrical cam 30 are assembled to the first housing 21, the second lens assembly 32 and first lens assembly 31 are mounted from the upper side of the first housing 21 so that the supporting arm 34a and 33a are fitted slidably to the first shaft 26a and the supporting arms 34b's and 33b's are fitted slidably to the second shaft 26b in the state the upper arm of the arms 34b's is located between the arms 33b's, then the cylindrical cam 30 is mounted from the upper side of the first housing through inserting the journal 30e of the cylindrical cam 30 into the bearing bore of the cam mounting part 27 (see FIG. 4) provided at a peripheral part of the base part of the first housing 21 so that the upper contact face of the cam follower arm 34c contacts the zooming face 30d and the lower contact face of the cam follower arm 33c contacts the zoom focusing face 30c. With this construction, the contact positions of the cam follower arms 33c and 34c with the zoom focusing face 30c and zooming face 30d of the spiral formation 30b move along the faces 30c and 30d respectively as the cylindrical cam rotates, and the first and second lens assemblies can be moved smoothly in the direction of the optical axis guided by the first and second shafts 26a and 26b.

As the lens holder 34 is provided with the depressions 34d's as shown in FIG. 9 and FIG. 10 so that it can advance into the space surrounded by the annular formation 22a without interfering with the protrusions (on which are defined the reference surfaces 22b's) of the annular formation 22a in the opening 22 shown in FIG. 3, the lens holder 34 can be moved near to the fixed lens retained in the opening 22. Therefore, a camera module can be provided which has zoom ratio large enough by securing enough moving distance of the lens holder 34. As the cutout opening part 11a is provided in the casing 11 as shown in FIG. 1, lens moving mechanism 13 such as lens holders 33, 34, and cylindrical cam 30 are accessible from outside before the opening part is covered, it is possible to perform visual inspection, a variety of adjustment, and accuracy confirmation of the optical lens system.

The driving motor (stepping motor, for example) 38 composing the lens moving mechanism 13 having the gear 38a attached to the motor shaft thereof is supported on the supporting face 41a of the second housing 41 with the gear-side down and the gear 38a inserted into the opening 41a as shown in FIG. 11. In this state, the gear 38a is located above the third gear 29c and meshes with the gear 29b shown in FIG. 8. Further, one of the branched parts of the flexible band 40 is attached to the boss 39 provided on a peripheral part of the driving motor 38, and the flexible band 40 is extended out of the second housing 41.

In one of the side wall 41c of the second housing 41 is defined the opening 41f, at which the other of the branched parts of the flexible band 40 mounted with the optical sensor 16 is attached. The optical sensor 16 detects the reference line on the cylindrical part 30a of the cylindrical cam 30 to determine the original position of the cylindrical cam 30 or rotation angle position or angles rotated. The flexible band having the optical sensor 16 mounted thereto serves also for covering the opening 41f. With the construction like this, the motor 38 is mounted at the opening 42 and the sensor 16 is mounted at the opening 41f without reducing the strength of the second housing, and a camera module can be constructed which is small in size, light in weight, and has enough strength, and a portable terminal equipped with the camera module can be provided.

In the camera module of the embodiment, as shown in FIG. 5, the last gear 29d which transmits driving force to the cylindrical cam 30 is fitted for rotation to the shaft body 28 and the shaft 26c and shaft 26d to which the gears 29a~29c which transmit driving force to the last gear 29d are made of metal. Therefore, these shafts 26c, 26d made of metal can be made small in diameter, for the rotation speeds of the gears fitted to the shafts are high but loads are small. As a result, the gears can be reduced in diameter, which effects to reduce the size of the camera module and suppress mechanical noise. The rotation speed of the last stage gear 29d is relatively slow and mechanical noise emitted is also low. As to the shaft body 28 made of resin to which the last stage gear 29d is fitted, the rotation speed of the last gear 29d is low and noise emission due to the rotation of the gear is minimal, and as the shaft body 28 is made of metal, it is light even if its diameter is increased to secure strength. Although only the shaft for the last gear is made of resin here, the other shafts may be made of resin. By forming the shaft for the last stage gear in one piece with the housing, the number of constituent parts is reduced and assembling man-hour can be reduced.

The driving motor 38 is attached to the second housing 41 of the casing 11 as shown in FIG. 12. The cutout opening 42 is defined in a side wall of the second housing 41 to extend in the vertical direction to be upwardly open. Further, the side wall is thin near the cutout opening 42 of the second housing 41, and the width of the cutout opening is smaller than the diameter of the driving motor 38. The depth of the second housing in the plane perpendicular to the direction of the optical direction of the lens holders 33, 34 is about the same as the sum of the diameter of the cylindrical cam and the diameter of the driving motor 38. Therefore, the driving motor 38 and the cylindrical cam 30 can be located to be adjacent to each other in the direction of the depth.

In FIG. 12, 13, each of the inside surface of both sides of the vertically extending cutout opening 42 is formed into the surface of a segment of a cylinder so that the peripheral surface of the driving motor 38 contacts the surfaces of the cylindrical segments tight fittingly in the state the driving motor 38 is supported on the supporting face 41a. Therefore, by applying an adhesive agent to the surfaces of the cylindrical segments as shown by hatching in FIG. 12 and locating the driving motor 38, the same is adhered and fixed to the second housing 41 firmly. The flexible band 40 is drawn out of the second housing 41 from the upper part of the housing as shown in FIG. 13. The part where the flexible band 40 is drawn out is covered by the cover plate 43 indicated by hatching in FIG. 13. The cutout opening part 42 is covered by the light shielding cover plate 42a (see FIG. 14).

By fixing the driving motor 38 in this way, the driving motor 38 is bonded and fixed to the surfaces of the cylindrical segment defined inside both sides of the vertically extending cutout opening part 42 tight fittingly with good accuracy. Therefore, the driving motor can be fixed easily and simply to the housing with good accuracy without necessity of using fastening screws or ring plate as has been the case with prior arts.

In the embodiment, as can be recognized from FIG. 14, the motor 38 and cylindrical cam 30 are juxtaposed to each other neighboring the moving lens holders 33, 34 of the optical lens system 12 and the center axis of the cylindrical cam 30 is parallel to the optical axis of the lens system 12 as recognized from FIG. 14, so that the optical lens system 12, motor 38, and cylindrical cam can be incorporated with ease. In addition, as the depth of the second housing in the plane perpendicular to the direction of the optical direction of the lens holders 33, 34 is about the same as the sum of the diameter of the cylindrical cam and the diameter of the driving motor 38, a downsized camera module can be provided.

The first housing 21 mounted with the lens system and driving mechanism is joined to the second housing 41 to which the driving motor is fixed such that; a corner part of the base part of the first housing 21 where the bolt hole 46 is provided mates with the boss part 59 of the second housing 41, the lower end face of the sidewall part 41c (see FIG. 11) of the second housing 41 mates with the upper end face of the side wall part 21b (see FIG. 5, 6, and 8) of the first housing 21, and the side end face 44 (see FIG. 11) of the second housing 41 mates with the side end face 45 (see FIGS. 5, 6, and 8) of the first housing 21. That is, an adhesive agent is applied onto the adhesive-joining part 47 of the first housing 21, a bolt (not shown in the drawings) is let in through the bolt hole indicated by reference numeral 46 in FIG. 4, the side end face 44 (see FIG. 11) of the second housing 41 with the driving motor fixed thereto mates with the side end face 45 (see FIGS. 5, 6, 8) of the first housing 21, and the second housing is fixed to the first housing with the bolt and the adhesive agent while preventing deviation of the housings relative to each other in rotational direction around the fixing part 46 to be fixed by the bolt.

When the first housing 21 and second housing 41 are joined together and fixed in this way, a board mounted with the CCD indicated by reference numeral 15 is adhered to the image pickup device attaching parts 60a and 60b of the first and second housing. The attaching of the board mounted with the CCD 15 is performed in such a way that; the board mounted with the CCD 15 is moved around 5 axes, taking for example three points indicated by reference numerals 48's as the basis for the movement while picking up an image sent through the optical lens system 12, a position of the board is detected with which the optical axis of the CCD 15 and that of the optical lens system 12 coincide and at the same time the image is optimally focused into the CCD 15, the board is retained in the position, and an adhesive agent is in poured to the concave 58. In this way, the board mounted with the CCD 15 is bonded and fixed to the casing 11.

After the board mounted with the CCD 15 is fixed to the casing 11, the cover plate (light shielding member) indicated by reference numeral 14 in FIG. 1 is attached by means of an adhesive agent to the casing 11 to cover the cutout opening defined by the first housing 21 and second housing 41, and the cutout opening part indicated by reference numeral 42 at the attaching part of the driving motor 38 and other cutout opening parts are covered similarly with cover plates (light shielding members) to bring the camera module of the embodiment shown in FIG. 1 to completion.

Although the casing 11 of the camera module of the embodiment has the cutout opening parts 11a, 11b shown in FIG. 2, the opening 41f shown in FIG. 12, and the cutout opening part 42, all of the opening parts are covered with the cover plate 14 which covers the opening part 11a, with the flexible band mounted with the optical sensor 16 which covers the opening 41f, with the cover plate 41e which covers the opening part 11b, and with the cover plate 42a which covers the opening part 42. As the cover plate 14 covers the opening part between the first thick side wall part 21a and the second thick side wall part 21b, the cover plate 41e covers the opening part of the second housing in the state the cover is bent at right angles to form a corner part, the opening 42 is relatively narrow in width and shut up by the motor 38 is covered with the cover plate 42a, and the opening 41f is relatively small and covered with the flexible band, the casing 11 is made strong enough by the presence of those covers. Further, as the cylindrical cam 30 and the lens moving mechanism including lens holders 33, 34, etc. can be accessed through the opening 11a before the cover plate 14 is attached, it is possible to perform visual inspection, a variety of adjustment, and accuracy confirmation of the optical lens system when assembling the camera module. Further, the sliding condition of the lens holders 33, 34 can be confirmed from the opening 11b, and the opening 42 is used for attaching the driving motor 38 as mentioned before. Thus, these opening parts are used effectively and serve to reduce the weight of the camera module.

In the camera module of the embodiment constructed like this, when the driving motor 38 shown in FIG. 11 rotates, the rotation force is transmitted from the gear 38a to the cylindrical cam 30 via the gears 29a~29d shown in FIG. 8. The cam follower arms 33c and 34c of the first and second lens assembly 31 and 32 are moved in the direction of the optical axis by the rotation of the spiral formation 30b of the cylindrical cam 30, and zooming and focusing can be done smoothly as mentioned before. The original position of the cylindrical cam 30 can be determined through detecting the reference line on the cylindrical part 30a by the optical sensor 16, and focus distance and focus position can be obtained by counting the number of pulses given to the driving motor such as a pulse motor.

As has been described in the forgoing, according to the embodiment, the strength of the first housing 21 is secured by forming such that the first side wall part 21a and second side wall part 21b extending from the two corners of the base part where the object side fixed lens is attached are thick, large opening parts 11a, 11b are formed between the first and second side walls with the opposite side opposing to the base part fully opened. The contours of the opening parts 11a and 11b are defined by the side wall of the second housing 41 which is attached to the first housing 21 such that one of the end faces the second housing 41 contacts the inner face of the base part of the first housing 21. The opening parts 11a and 11b are covered with the thin cover plate 14, 41e for shielding light, and the fully opened opposite side opposing to the base part is covered with the board mounted with the image pickup device CCD 15). So, the outer frame of the camera module is formed in a rectangular parallelepiped shape. Thus, the camera module can be formed to have the outer frame of light weight having necessary strength by combining thick parts and thin parts. The base part of the first housing 21 is formed to be thick enough to be capable of firmly supporting the guide shafts for guiding the moving lens holders in the direction of the optical axis. Further, the lens moving mechanism, etc. can be adjusted by accessing through the openings formed in the sides of the frame, the openings being covered after adjustment, so that a camera module which is small in size and light in weight even when autofocussing (AF) function and zooming function are integrated can be obtained.

Further, the position of the driving motor is defined by the surface of cylinder segment formed on the inside of the second housing with its radius the same as that of the driving motor and the supporting face 41a for supporting an end of the driving motor to define the vertical position thereof and fixed to the second housing by means of an adhesive agent without using a screw, etc., so that the driving motor very small in size can be positioned accurately with the simple construction saving manufacturing and assembling cost. Further, as the aperture 42 of a width smaller than the diameter of the driving motor is provided in the part of the second housing, where the outer diameter of the driving motor contacts, the surface of the cylindrical segment to be closely contacted with the driving motor can be defined somewhat deep in the side wall of the second housing without causing the formation of an extremely thin portion in the side wall, and the driving motor can be attached such that a part of its periphery is embedded in the wall with the aperture covered with the thin cover for shielding light. This can reduce the thickness of the camera module. As the depth, the inner size of the thickness of the casing is about the same as the sum of the diameter of the cylindrical cam and the diameter of the driving motor, the camera module can be constructed small in thickness.

Further, as the opening 41f is formed in the side wall of the second housing to allow the optical sensor 16 attached to the bracket (flexible band 40) for detecting the rotation position or rotation angles of the cylindrical cam 30 to face the cylindrical cam, the thickness of the side wall at the opening can be utilized for attaching the optical sensor, and the cylindrical cam can be located that much nearer to the inside surface of the housing and the width of the camera module can be reduced.

Further, as the casing 11 of the camera module is made of resin containing fluorine, durability and sliding property are increased. So even if the shaft body and bearing hole are formed in one piece with the casing, the gears and cylindrical cam can rotate smoothly and the durability of the shaft body and bearing hole is increased. Further, by adopting resin material containing fluorine not a simple resin for the casing, the casing can be increased in strength, as a result the casing can be formed thinner, and downsizing and weight saving of the camera module can be realized.

As has been described in the foregoing, according to the embodiment, a camera module having autofocusing and/or zooming functions and is most suitable to incorporate in a portable terminal, etc. can be provided. The invention can be applied not only to a camera module for a portable terminal but also to a digital camera.

What is claimed:

1. A camera module comprising:
    an optical lens system,
    a lens moving mechanism for moving moving-lenses in said optical lens system in a predetermined direction in order to perform focal adjustment and/or to change image magnification,
    a lens holder or holders for retaining said moving lenses,
    a first housing composing a casing of the camera module to which said lens moving mechanism and said lens holder or holders are mounted retaining at least a part of the lenses of said optical lens system and having a first side wall which is located at said part of the lenses side and formed to have at least partially thick-walled part and a second side wall,
    a second housing to which a driving source for driving said lens moving mechanism is attached,
    a first and a second opening part defined in said first and/or said second housing,
    guide shafts located at side end parts of said first side wall of said first housing for guiding the movement of said lens holder or holders,
    a cylindrical cam located at a fringe part of said second opening part of said first housing in the vicinity of the periphery of said lens holder or holders for moving said lens holder or holders in the direction of the optical direction, and
    cover plates for covering said first and second opening parts,
    wherein said first housing and said second housing are joined together to form said casing of the camera module,
    wherein all of said optical lens system, said lens moving mechanism, said lens holder or holders, said driving source, said guide shafts, and said cylindrical cam are in said casing.

2. The camera module according to claim 1, wherein a guide shaft attaching part for attaching said guide shafts and a bearing part for supporting an end part of said cylindrical cam are formed in one piece with said first housing, and
    a shaft body for supporting the other end part of said cylindrical cam is formed in one piece with said second housing.

3. The camera module according to claim 1, wherein a cylindrical cam having cam face or faces for moving said lens holder or holders in the direction of the optical axis is located in the vicinity of the guide shaft located near the fringe part of said second opening part.

4. A camera module comprising:
    an optical lens system,
    a lens moving mechanism for moving moving-lenses in said optical lens system in a predetermined direction in order to perform focal adjustment and/or to change image magnification,
    a lens holder or holders for retaining said moving lenses,
    a first housing composing a casing of the camera module to which said lens moving mechanism and said lens holder or holders are mounted retaining at least a part of the lenses of said optical lens system and having a first side wall which is located at said part of the lenses side and formed to have at least partially thick-walled part and a second side wall,
    a second housing to which a driving source for driving said lens moving mechanism is attached,
    a first and a second opening part defined in said first and/or said second housing,
    guide shafts located at side end parts of said first side wall of said first housing for guiding the movement of said lens holder or holders,
    a cylindrical cam located at a fringe part of said second opening part of said first housing in the vicinity of the periphery of said lens holder or holders for moving said lens holder or holders in the direction of the optical direction, and
    cover plates for covering said first and second opening parts,
    wherein said second housing has an opening part in one of the side walls thereof, a driving source positioning part being defined inside the wall where said opening part is formed for attaching and fixing said driving source, and an opening in another side wall for attaching a sensor for detecting the rotation position or rotation angle or rotated angles of said cylindrical cam composing said lens moving mechanism.

5. The camera module according to claim 4, wherein the wall near said opening part for attaching said driving source is formed thin so that the outer surface of the driving source attached there does not protrude out of the outer surface of the wall but is near level with the outer surface of the wall, and the driving source is fixed to the inner surface of the wall by means of an adhesive agent with the peripheral surface of the driving source brought into contact with said inner surface.

6. The camera module according to claim 4, wherein a band mounted with said sensor serves as a cover plate to cover said opening for attaching the sensor.

7. The camera module according to claim 4, wherein gears are arranged between said driving source and said cylindrical cam for transmitting the driving force of said driving source to said cylindrical cam.

8. The camera module according to claim 1, wherein the optical axis of the optical lens system and the center axis of said cylindrical cam are parallel to each other.

9. The camera module according to claim 4, wherein the opening part where a driving source positioning part is defined inside the wall of the second housing is defined such that both sides of the opening part is thin-walled, and the opening part is covered with a cover plate.

10. The camera module according to claim 4, wherein the width of the opening part where a driving source positioning part is defined inside the wall of the second housing is smaller than the width of said driving source, and the shape of the opening part is defined to be about the same as the shape of the peripheral surface of the driving source so that the peripheral surface of the driving source can be brought into contact with the opening part for the driving source to be bonded there.

11. The camera module according to claim 4, wherein a supporting face is provided at the bottom of the opening part where a driving source positioning part is defined inside the wall of the second housing for allowing the driving source to contact there so that the position of the driving source in the direction of the optical axis is determined.

12. The camera module according to claim 1, wherein the depth of said casing in a plane perpendicular to the optical axis of the optical lens system is about the same as the sum of the cylindrical cam and the thickness (length in said depth direction) of the driving source.

13. A portable terminal containing a camera module which comprises, an optical lens system, a lens moving mechanism for moving moving-lenses in said optical lens system in a predetermined direction in order to perform focal adjustment and/or to change image magnification, a lens holder or holders for retaining said moving lenses, a first housing composing a casing of the camera module to which said lens moving mechanism and said lens holder or holders are mounted retaining at least a part of the lenses of said optical lens system and having a first side wall which is located at said part of the lenses and formed to have at least partially thick-walled part and a second side wall, a second housing to which a driving source for driving said lens moving mechanism is attached, a first and a second opening part defined in said first and/or said second housing, guide shafts located at side end parts of said first side wall of said first housing for guiding the movement of said lens holder or holders, a cylindrical cam located at a fringe part of said second opening part of said first housing in the vicinity of the periphery of said lens holder or holders for moving said lens holder or holders in the direction of the optical direction, and cover plates for covering said first and second opening parts;

a case body equipped with said camera module; and an operation portion provided to said case body for manipulating the lens moving mechanism of said camera module, wherein said first housing and said second housing are joined together to form said casing of the camera module, wherein all of said optical lens system, said lens moving mechanism, said lens holder or holders, said driving source, said guide shafts, and said cylindrical cam are in said casing.

14. The camera module according to claim 1, wherein said first and second opening parts integrally form one opening part.

* * * * *